(12) United States Patent
Oulachgar et al.

(10) Patent No.: US 9,476,774 B2
(45) Date of Patent: Oct. 25, 2016

(54) UNCOOLED MICROBOLOMETER PIXEL AND ARRAY FOR CONFIGURABLE BROADBAND AND MULTI-FREQUENCY TERAHERTZ DETECTION

(71) Applicant: INSTITUT NATIONAL D'OPTIQUE, Québec (Québec) (CA)

(72) Inventors: Hassane Oulachgar, Québec (CA); Christine Alain, Québec (CA)

(73) Assignee: INSTITUT NATIONAL D'OPTIQUE, Quebec, Quebec (CA)

( * ) Notice: Subject to any disclaimer, the term of this patent is extended or adjusted under 35 U.S.C. 154(b) by 0 days.

(21) Appl. No.: 14/573,689

(22) Filed: Dec. 17, 2014

(65) Prior Publication Data

US 2016/0178444 A1 Jun. 23, 2016

(51) Int. Cl.
| | |
|---|---|
| *G01J 5/02* | (2006.01) |
| *G01J 5/20* | (2006.01) |
| *G01J 5/08* | (2006.01) |
| *G01J 3/36* | (2006.01) |

(Continued)

(52) U.S. Cl.
CPC .. *G01J 5/20* (2013.01); *G01J 3/36* (2013.01); *G01J 3/42* (2013.01); *G01J 5/024* (2013.01); *G01J 5/0853* (2013.01); *G01J 5/0862* (2013.01); *G01J 2003/1213* (2013.01); *G01J 2005/202* (2013.01)

(58) Field of Classification Search
CPC ............. G01J 5/20; G01J 5/08; G01J 5/16; G01J 5/12; H04N 5/33
See application file for complete search history.

(56) References Cited

U.S. PATENT DOCUMENTS

| | | |
|---|---|---|
| 6,985,116 B2 | 1/2006 | Agnese et al. |
| 7,199,358 B2 | 4/2007 | Kim et al. |
| 7,491,938 B2 | 2/2009 | Geneczko et al. |

(Continued)

FOREIGN PATENT DOCUMENTS

EP    0903566 B1    12/2004

OTHER PUBLICATIONS

Gonzalez et al., Antenna-coupled VOx thin-film microbolometer array, Microwave and Optical Technology Letters, vol. 38, No. 3, p. 235-237, Aug. 5, 2003.

*Primary Examiner* — David Porta
*Assistant Examiner* — Mamadou Faye
(74) *Attorney, Agent, or Firm* — Merchant & Gould P.C.

(57) ABSTRACT

An uncooled microbolometer pixel for detection of electromagnetic radiation is provided that includes a substrate, a thermistor assembly and an absorber assembly. The thermistor assembly includes a thermistor platform suspended above the substrate, one or more thermistors on the thermistor platform, and an electrode structure electrically connecting the thermistors to the substrate. The absorber assembly includes an optical absorber over the thermistor assembly and a reflector provided under and forming a resonant cavity with the optical absorber. The optical absorber is in thermal contact with the thermistors and exposed to the electromagnetic radiation. The optical absorber includes a set of elongated resonators determining an absorption spectrum of the optical absorber. An array of microbolometer pixels is also provided, in which the resonators of different pixels can have different lengths determining different absorption spectra, thereby enabling configurable broadband and/or multi-frequency detection, in particular in the terahertz region.

13 Claims, 23 Drawing Sheets

(51) Int. Cl.
*G01J 3/42* (2006.01)
*G01J 3/12* (2006.01)

(56) References Cited

U.S. PATENT DOCUMENTS

| | | | |
|---|---|---|---|
| 2007/0138395 A1* | 6/2007 | Lane et al. | 250/353 |
| 2011/0019180 A1* | 1/2011 | Kruglick | 356/51 |
| 2011/0304005 A1* | 12/2011 | Brueckl et al. | 257/467 |
| 2014/0036340 A1* | 2/2014 | Hong | G02B 26/001 359/290 |
| 2014/0091217 A1* | 4/2014 | Oulachgar et al. | 250/338.3 |
| 2014/0166882 A1* | 6/2014 | Oulachgar et al. | 250/338.4 |
| 2015/0063413 A1* | 3/2015 | Kubota | G01J 5/58 374/121 |

\* cited by examiner

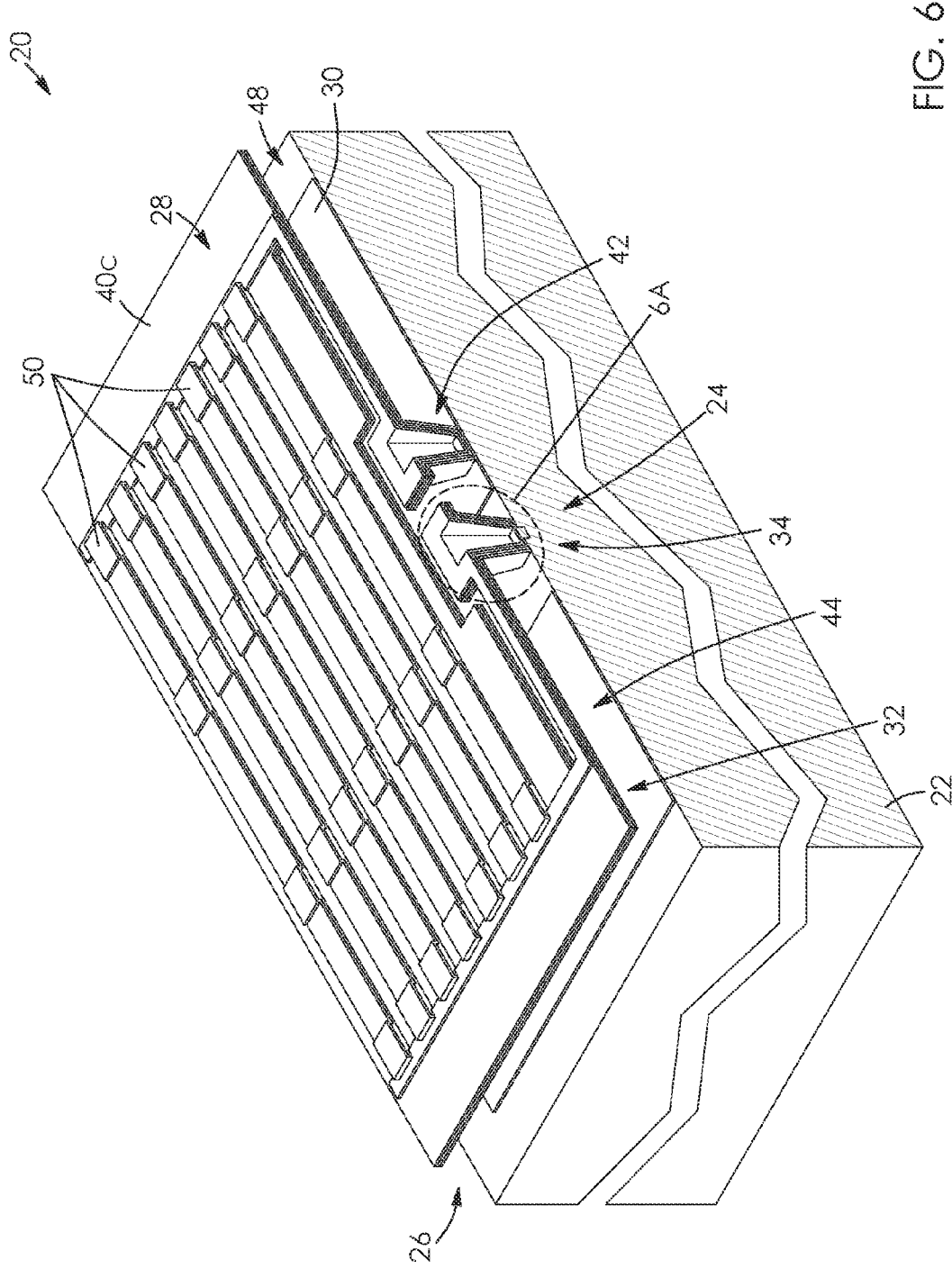

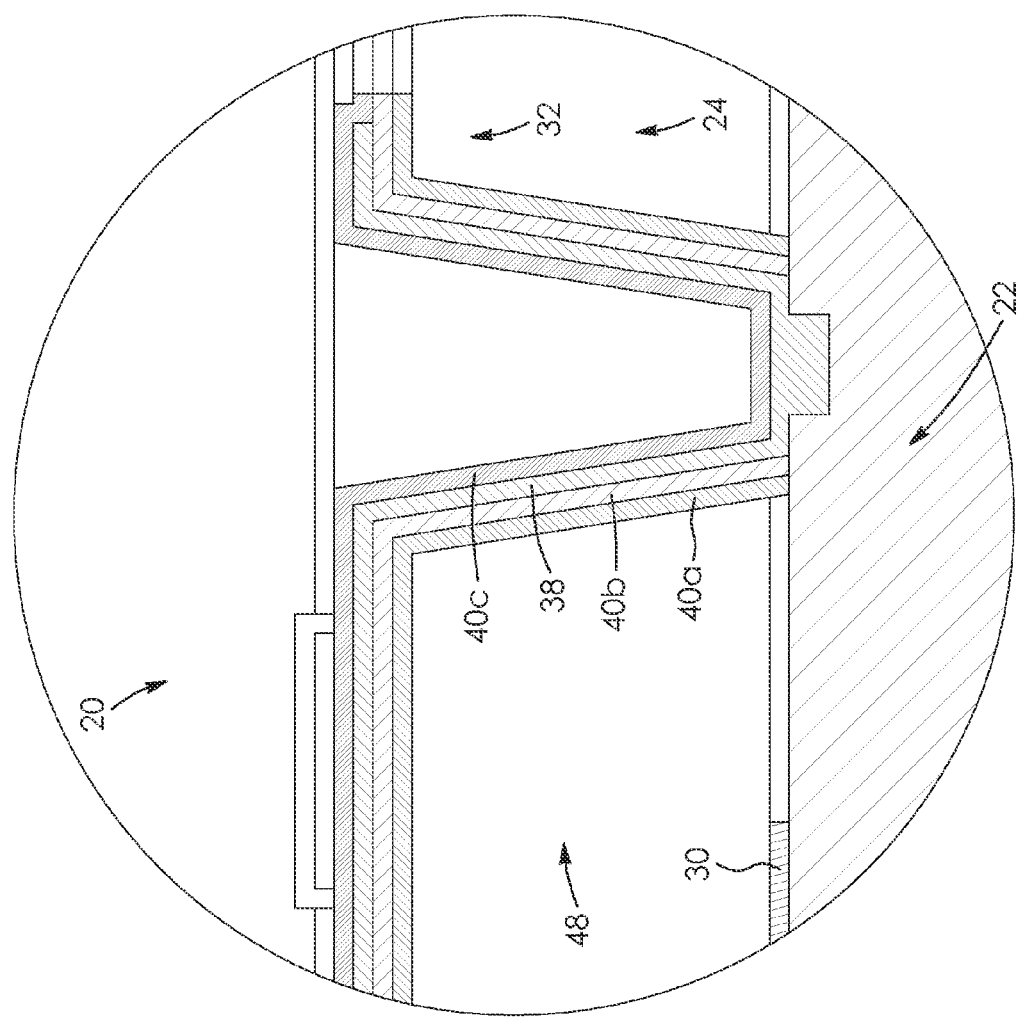

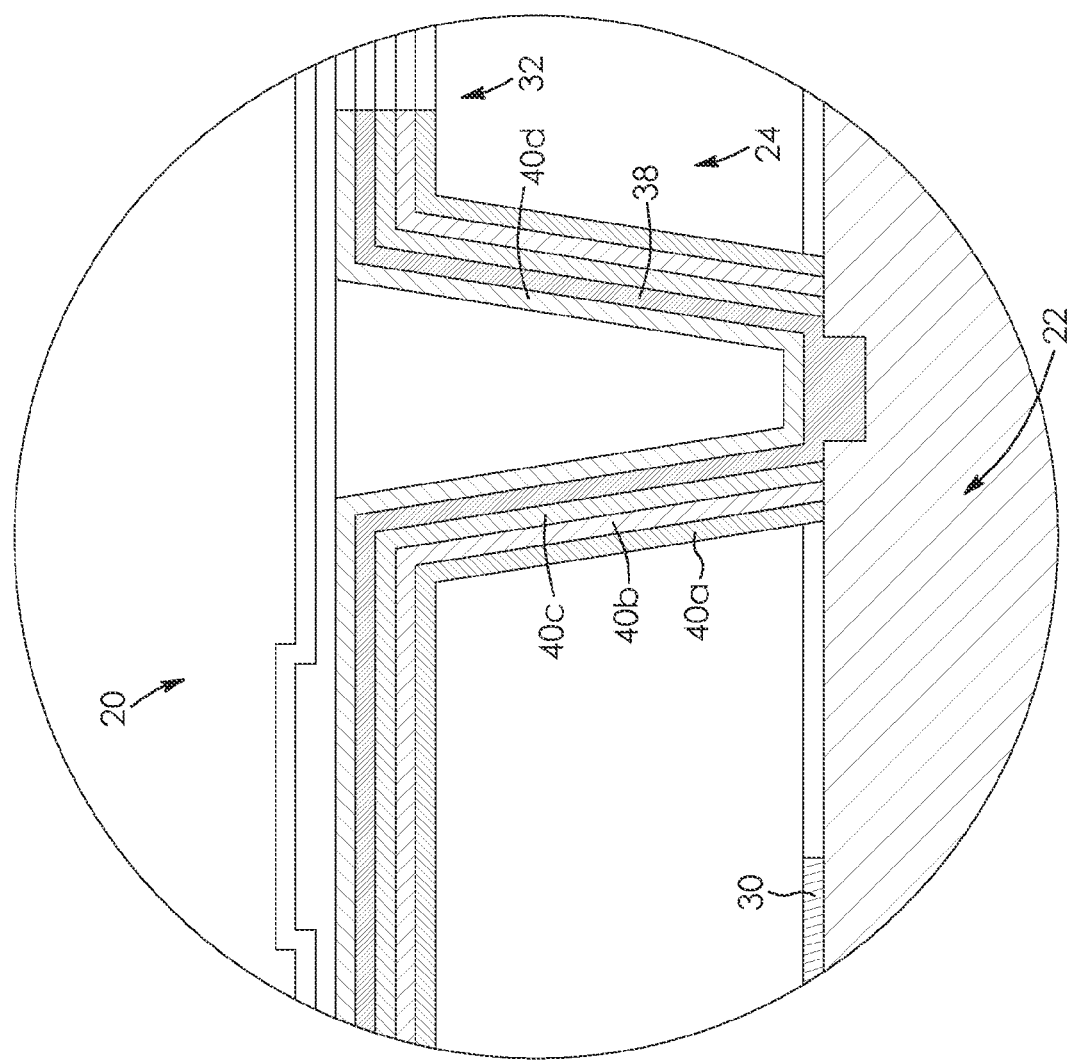

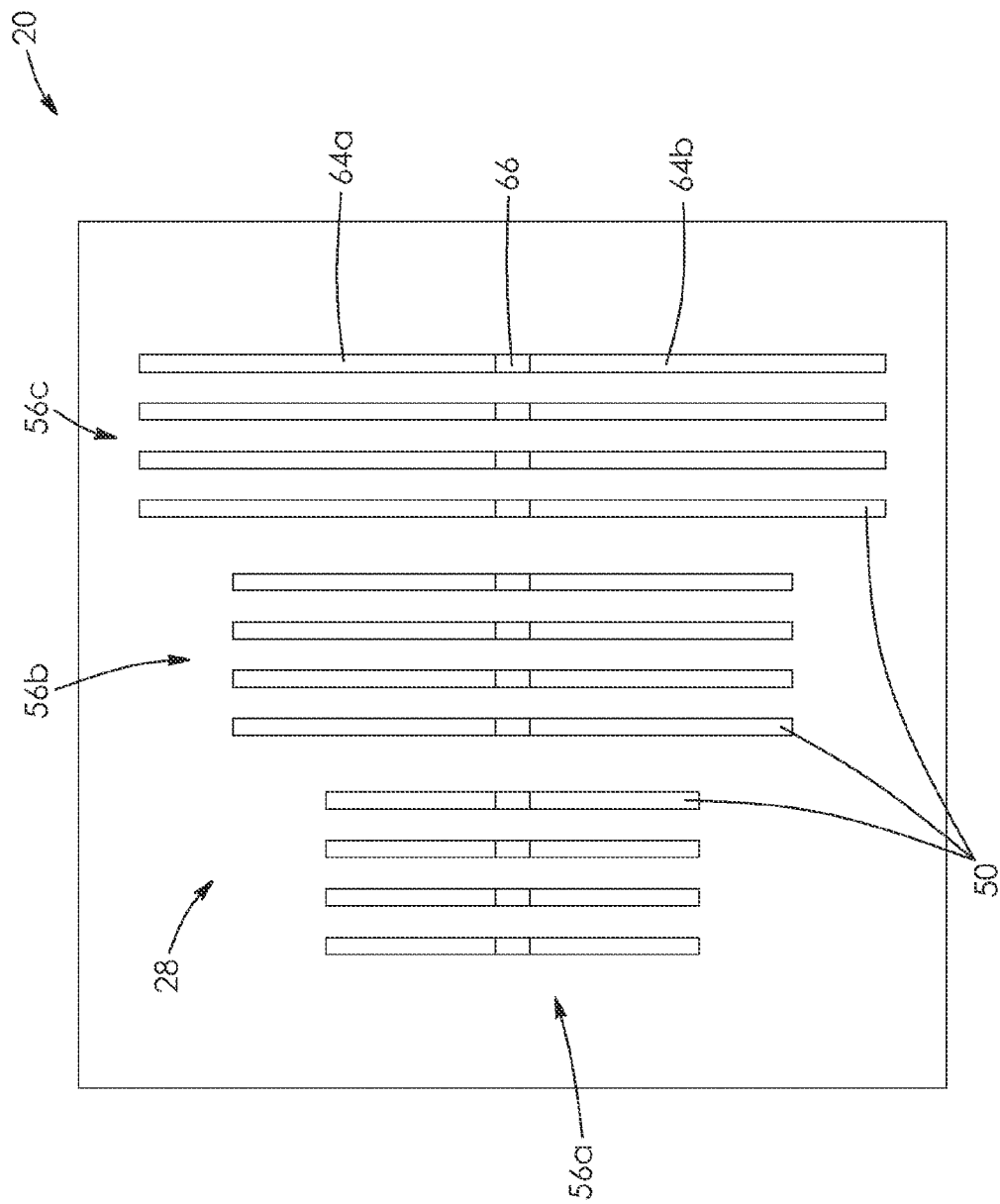

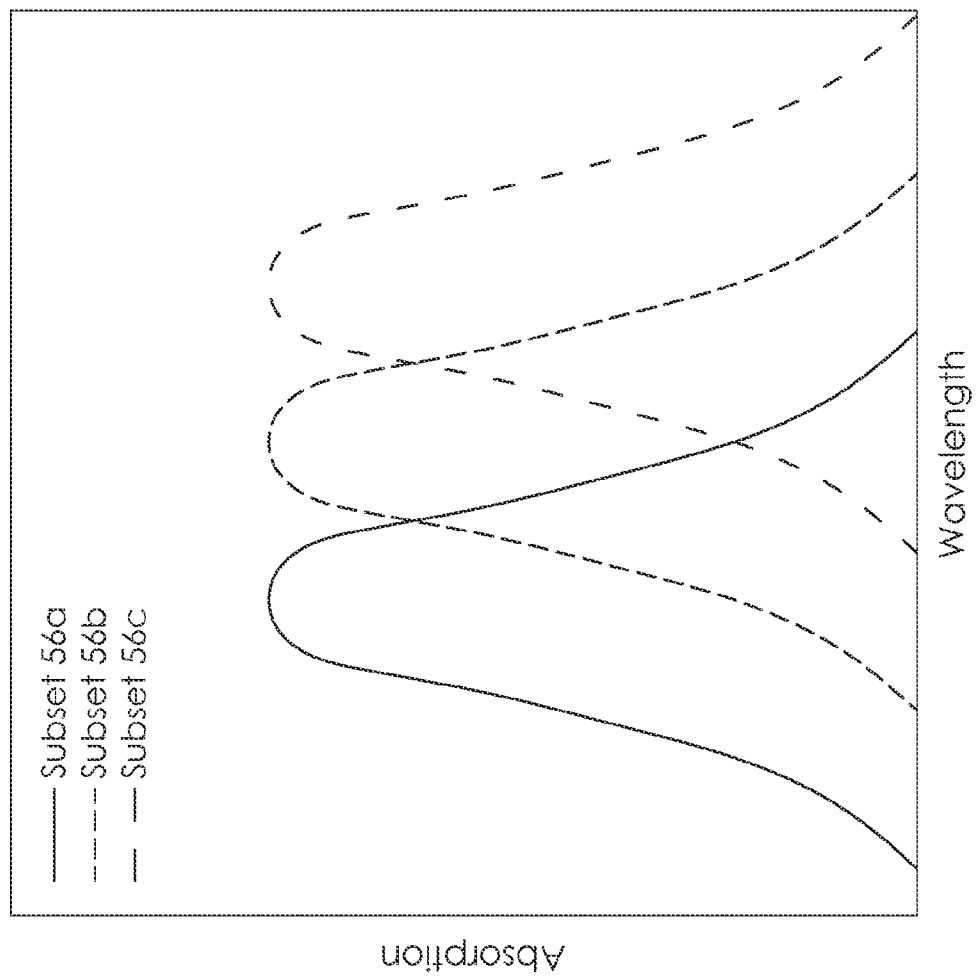

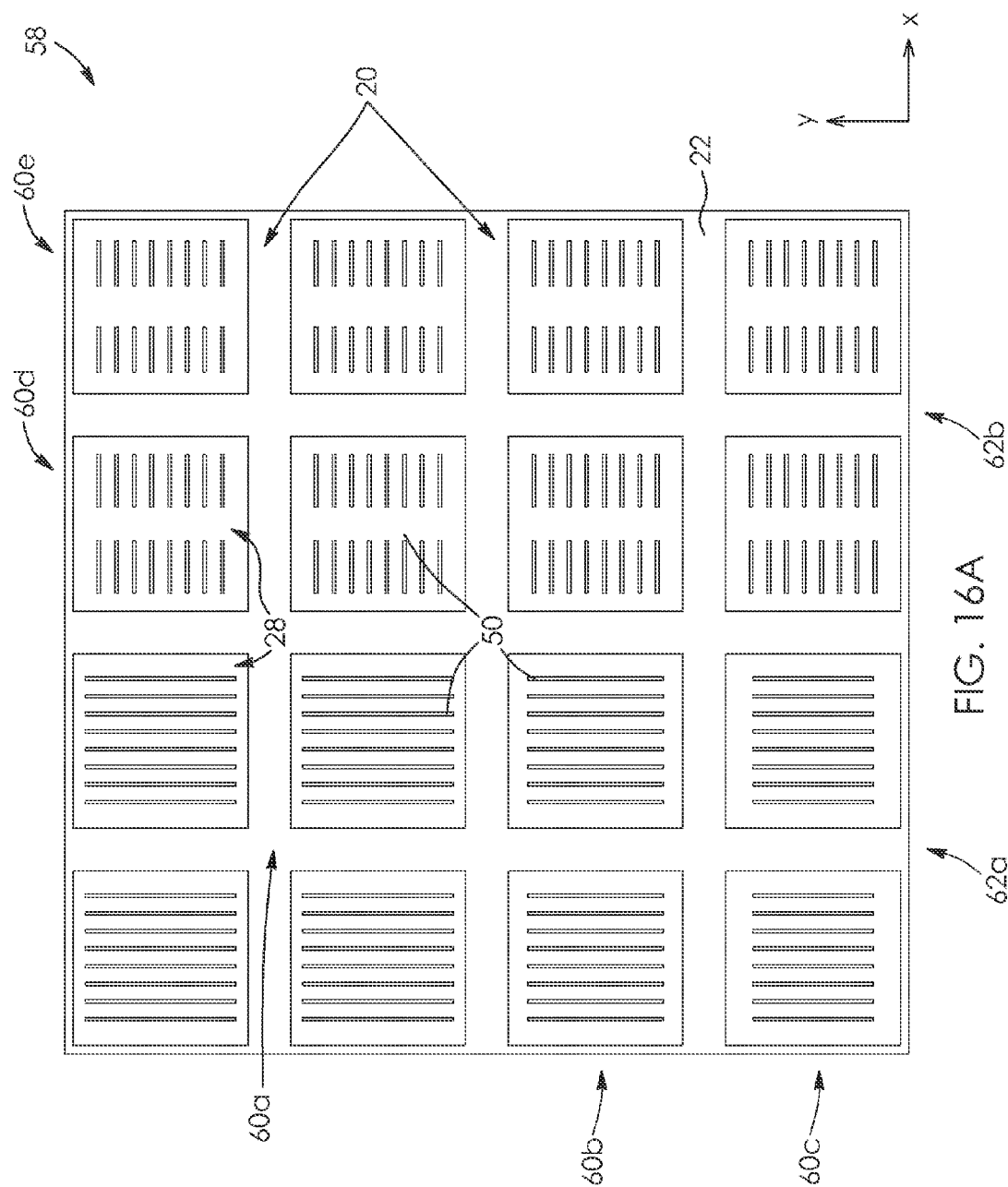

UNCOOLED MICROBOLOMETER PIXEL AND ARRAY FOR CONFIGURABLE BROADBAND AND MULTI-FREQUENCY TERAHERTZ DETECTION

TECHNICAL FIELD

The general technical field relates to uncooled microbolometers and, in particular, to a configurable microbolometer pixel array suitable for broadband or multi-frequency absorption and detection of terahertz radiation.

BACKGROUND

Thermal detectors operate by absorbing energy from incident electromagnetic radiation and by converting the absorption-generated heat into an electrical signal indicative of the amount of absorbed radiation. Perhaps the most prominent type of thermal detectors currently available is uncooled microbolometer detectors, or simply microbolometers. A microbolometer is typically based on a suspended platform or bridge structure having a low thermal mass, which is held above and thermally insulated from a substrate by a support structure. The platform is provided with a thermistor, which is a resistive element whose electrical resistance changes in response to temperature variations caused by the absorbed radiation. The thermistor may, for example, be composed of a material having a high temperature coefficient of resistance (TCR), such as vanadium oxide and amorphous silicon. Because they do not require cryogenic cooling, uncooled microbolometers can operate at room temperature, which makes them well suited for integration within compact and robust devices that are often both less expensive and more reliable than those based on cooled detectors.

Arrays of uncooled microbolometers can be fabricated on a substrate using common integrated-circuit fabrication techniques. Such arrays are often referred to as "focal plane arrays" (FPAs), while the individual microbolometers forming the arrays may be referred to as "microbolometer pixels", or simply "pixels". In most current applications, arrays of uncooled microbolometer pixels are used to sense radiation in the infrared region of the electromagnetic spectrum, usually in the mid-wave infrared, encompassing wavelengths of between about 3 and 5 micrometers ($\mu m$), or in the long-wave infrared, encompassing wavelengths of between about 8 and 14 $\mu m$. These arrays are often integrated in uncooled thermal cameras for sensing incoming infrared radiation from a target scene. Each microbolometer pixel absorbs some infrared radiation resulting in a corresponding change in the pixel temperature, which in turn produces a corresponding change in electrical resistance. A two-dimensional pixelated thermal image representative of the infrared radiation emitted from the scene can be generated by converting the changes in electrical resistance of each pixel into an electrical signal that can be displayed on a screen or stored for later viewing or processing. By way of example, state-of-the-art arrays of infrared uncooled microbolometer arrays now include 1024 by 768 pixel arrays with a 17-$\mu m$ pixel pitch.

In the last decade, there has been a growing interest in extending uncooled microbolometer spectroscopy and sensing applications beyond the traditional infrared range, namely in the far-infrared and terahertz (or sub-millimeter) spectral regions. As known in the art, these regions of the electromagnetic spectrum have long been relatively unused for industrial and technological purposes at least partly due to the lack of efficient techniques for detection and generation of radiation in this spectral range.

Extending the absorption spectrum of uncooled microbolometers beyond 30-$\mu m$ wavelength is not straightforward, notably because the materials used to fabricate the detectors absorb predominantly in the infrared, and also because the pitch of terahertz-sensitive pixels is typically larger than that of infrared-sensitive pixels to avoid diffraction effects. Additionally, in order to optimize radiation absorption in the desired spectral band, conventional infrared microbolometer detectors generally include a reflector deposited on the underlying substrate to form a quarter-wavelength optical resonant cavity with the suspended platform. However, forming such a resonant cavity for detecting electromagnetic radiation at wavelengths longer than 10 $\mu m$ is generally not practical with surface micromachining techniques commonly used in the fabrication of uncooled microbolometers.

Several approaches have been devised in order to improve the spectral response of uncooled microbolometers beyond 30 $\mu m$. One approach that has been studied and used in different applications relies on broadband thin-film absorbers, such as metallic blacks, organic blacks, and carbon nanotubes. However, fabricating these thin-film absorbers requires special deposition and processing techniques, which are generally not fully compatible with standard microfabrication and packaging processes of uncooled microbolometers.

Another approach is based on antenna-coupled microbolometer detectors, in which the electromagnetic radiation is absorbed by planar antennas designed for sensing specific wavelengths determined by the geometry of the antennas. A 50-100 ohm heat-sensitive thin-film resistor is commonly used as an antenna load to convert variations of incident optical power into an electrical signal, usually a voltage or current. Although this approach may be promising for some applications, it is generally not fully compatible with existing microbolometer focal plane array technology, as fabricating these antenna-coupled microbolometer detectors involves electron-beam or deep-ultraviolet lithography and a redesign of the underlying readout integrated circuit (ROIC).

Accordingly, various challenges exist in the development of uncooled microbolometer arrays that are operable in the terahertz and far-infrared regions and that could advantageously provide configurable broadband or multi-band absorption spectra.

SUMMARY

According to an aspect of the invention, there is provided an uncooled microbolometer pixel for detection of electromagnetic radiation. The uncooled microbolometer pixel includes:
  a substrate;
  a thermistor assembly comprising a thermistor platform suspended above the substrate, at least one thermistor on the thermistor platform, and an electrode structure electrically connecting the at least one thermistor to the substrate; and
  an absorber assembly comprising:
    an optical absorber over the thermistor assembly, the optical absorber being in thermal contact with the at least one thermistor and exposed to the electromagnetic radiation, the optical absorber comprising a set of elongated resonators determining an absorption spectrum of the optical absorber; and a reflector provided under and forming a resonant cavity with the optical absorber.

In some embodiments, the absorber assembly further includes an absorber platform suspended above the thermistor platform, the optical absorber is provided on the absorber platform, in thermal contact with the thermistor platform. In some of these embodiments, the reflector extends on the thermistor platform over the at least one thermistor and the electrode structure.

In some embodiments, the optical absorber extends on the thermistor platform over the at least one thermistor and the electrode structure, and the reflector is disposed on the substrate under the thermistor platform. Also, the at least one thermistor and the electrode structure each lies under one or more of the elongated resonators. In some of these embodiments, the absorber assembly may further include an additional optical absorber provided with a set of additional elongated resonators. These additional optical absorber extend on the thermistor platform under the at least one thermistor and the electrode structure such that the at least one thermistor and the electrode structure each lies over one or more of the additional elongated resonators.

In some embodiments, the optical absorber shields at least partially the at least one thermistor and the electrode structure from the electromagnetic radiation. Additionally or alternatively, in other embodiments, the reflector shields at least partially the at least one thermistor and the electrode structure from the electromagnetic radiation.

In some embodiments, the set of elongated resonators is divided in a number of subsets of elongated resonators, and the elongated resonators from each subset have different lengths determining different absorption spectra.

In some embodiments, the set of elongated resonators is divided in a first and a second subset of elongated resonators extending along first and second orthogonal axes and configured to absorb a first and a second component of the electromagnetic radiation polarized along the first and second orthogonal axes, respectively.

In some embodiments, the optical absorber is configured to absorb the electromagnetic radiation in a wavelength range from about 30 to 1000 µm, encompassing the terahertz region of the electromagnetic spectrum.

According to another aspect of the invention, there is provided a microbolometer array including a plurality of arrayed uncooled microbolometer pixels as described above.

In some embodiments, the elongated resonators of different ones of the uncooled microbolometer pixels have different lengths determining different absorption spectra.

In some embodiments, a combination of the absorption spectra of the plurality of uncooled microbolometer pixels forms a continuous broadband absorption spectrum of the microbolometer array.

In some embodiments, the plurality of uncooled microbolometer pixels is arranged in a matrix of rows and columns, and, for either each column or row, the uncooled microbolometer pixels have substantially identical absorption spectra, and the elongated resonators of uncooled microbolometer pixels of adjacent columns or rows have different lengths determining different but partially overlapping absorption spectra.

In some embodiments, the plurality of uncooled microbolometer pixels is divided in groups of uncooled microbolometer pixels, and a combination of the absorption spectra of the uncooled microbolometer pixels of each group forms a respective continuous absorption band in an absorption spectrum of the array.

Other features and advantages of the embodiments of the present invention will be better understood upon reading of preferred embodiments thereof with reference to the appended drawings.

BRIEF DESCRIPTION OF THE DRAWINGS

FIG. 6 is a cross-sectional perspective view of the uncooled microbolometer pixel of FIG. 5, taken along section line 6. FIG. 6A is an enlargement of portion 6A of FIG. 6.

FIG. 9A is an enlargement of portion 9A of FIG. 9.

FIG. 11A is a schematic top plan view of an uncooled microbolometer pixel including three subsets of elongated resonators, in accordance with another embodiment. The resonators are all parallel to one another and the resonators from different subsets have different lengths. FIG. 11B is a schematic absorption spectrum plotted as a function of wavelength of the optical absorber of the uncooled microbolometer pixel of FIG. 11A.

FIG. 16A is a schematic top plan view of a microbolometer array, in accordance with another embodiment. The array is divided in a first and a second group of pixels, the elongated resonators of the pixels in the first group being orthogonal to the elongated resonators of the pixels of the second group. Each group is further divided in a number of subsets of pixels, the resonators of pixels from different subsets having different lengths.

DETAILED DESCRIPTION

Figure 1:
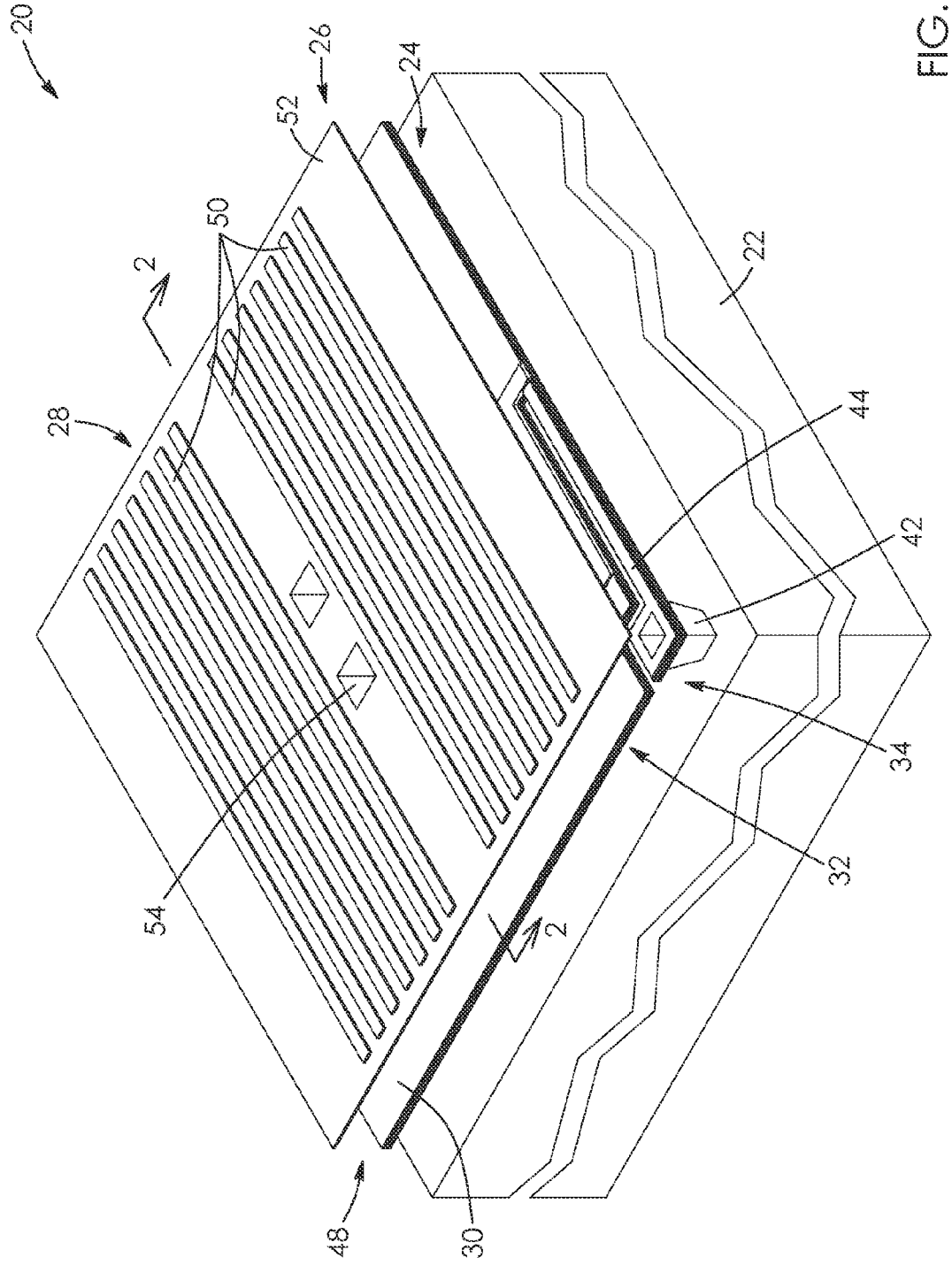
FIG. 1 is a schematic perspective view of an uncooled microbolometer pixel, in accordance with an embodiment.

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments.

General Overview

The present description generally relates to an uncooled microbolometer pixel for detection of electromagnetic radiation, and to a microbolometer array including a plurality of such uncooled microbolometers pixels.

It is to be noted that, for simplicity, the expression "uncooled microbolometer pixel" may in some instances be shortened to "uncooled microbolometer", "microbolometer pixel", "microbolometer" or "pixel". Likewise, the "microbolometer array" may in some instances be referred to as "microbolometer pixel array", "pixel array" or simply "array".

Throughout the present description, the term "microbolometer" is understood to refer to an uncooled thermal radiation detector that operates by absorbing incident electromagnetic radiation and converting the absorbed radiation into heat. Meanwhile, the term "uncooled" is intended to refer to a microbolometer that operates at or near ambient temperature, without requiring any type of cryogenic cooling system.

A typical microbolometer generally includes one or more thermistors. A thermistor is a resistive element whose electrical resistance changes in response to temperature variations caused by the absorbed radiation. This physical property is used to measure the energy or power carried by the radiation incident on the microbolometer, assuming an appropriate calibration of the response of the thermistor. The thermistor is generally thermally insulated from an underlying substrate and from its surroundings to allow the absorbed incident radiation to generate a temperature change in the thermistor while remaining mostly unaffected by the temperature of the substrate and surroundings. Microbolometers are generally fabricated using integrated-circuit fabrication techniques and find applications, among other fields, in night vision, thermal imaging, remote sensing, spectroscopy, radiation and explosive detection, environmental monitoring, and medical diagnosis.

As for most commonly known microbolometer structures, the microbolometer pixel and array according to embodiments of the invention may be fabricated using conventional surface micromachining and photolithography techniques. For example, in some embodiments, the microbolometer pixel may be fabricated using a monolithic integration approach, wherein the substrate of the microbolometer pixel array, preferably provided with an underlying ROIC, is pre-manufactured using standard complementary metal-oxide-semiconductor (CMOS) processes. More particularly, it can be an advantage of certain embodiments of the present invention to provide uncooled microbolometer pixels whose absorption spectrum encompasses wavelengths longer than the wavelengths of infrared radiation but whose fabrication is carried out using techniques similar to those of common use for manufacturing infrared microbolometers. In such embodiments, the various components of the microbolometer pixel may successively be deposited and patterned on the substrate using common thin-film deposition techniques paired with selective photoresist and sacrificial layer etching processes. However, it will be understood that the uncooled microbolometer pixel according to embodiments of the invention may be fabricated using other manufacturing techniques, for example bulk micromachining, without departing from the scope of the invention.

Throughout the present description, the term "electromagnetic radiation" is intended to refer to photons in any appropriate wavelength range. In particular, the terms "light" and "optical" are meant to refer to electromagnetic radiation in any appropriate region of the electromagnetic spectrum, and are not limited to visible light. Furthermore, although some embodiments of the microbolometer pixels may be useful in terahertz applications, those skilled in the art will recognize that other embodiments could additionally or alternatively operate in other regions of the electromagnetic spectrum, for example in the millimeter, infrared and visible regions, without departing from the scope of the invention.

Broadly described, and as will be discussed further below, embodiments of the microbolometer pixel include a substrate, a thermistor assembly and an absorber assembly. The thermistor assembly includes a thermistor platform suspended above the substrate, one or more thermistors on the thermistor platform, and an electrode structure electrically connecting the thermistors to the substrate. Meanwhile, the absorber assembly includes an optical absorber over the thermistor assembly and a reflector provided under the optical absorber. The optical absorber and the reflector together form a resonant cavity. The optical absorber is exposed to the electromagnetic radiation and includes a set of elongated resonators which determine an absorption spectrum of the optical absorber.

In some implementations, by properly selecting the length and orientation of the individual elongated resonators, the absorption spectrum of the optical absorber of the pixel can be designed to achieve wavelength- and polarization-selective absorption in specific regions of the electromagnetic spectrum, for example in the terahertz region. In the case of an array of microbolometer pixels, the elongated resonators of different pixels can differ from one another to achieve different absorption spectra. For example, in some embodiments, the absorption spectrum of the array as a whole can be configured to achieve broadband absorption of radiation in one or more bands in a region of the electromagnetic spectrum by configuring the absorption spectra of different pixels to have partially overlapping absorption peaks.

Uncooled Microbolometer Pixel

Figure 2:
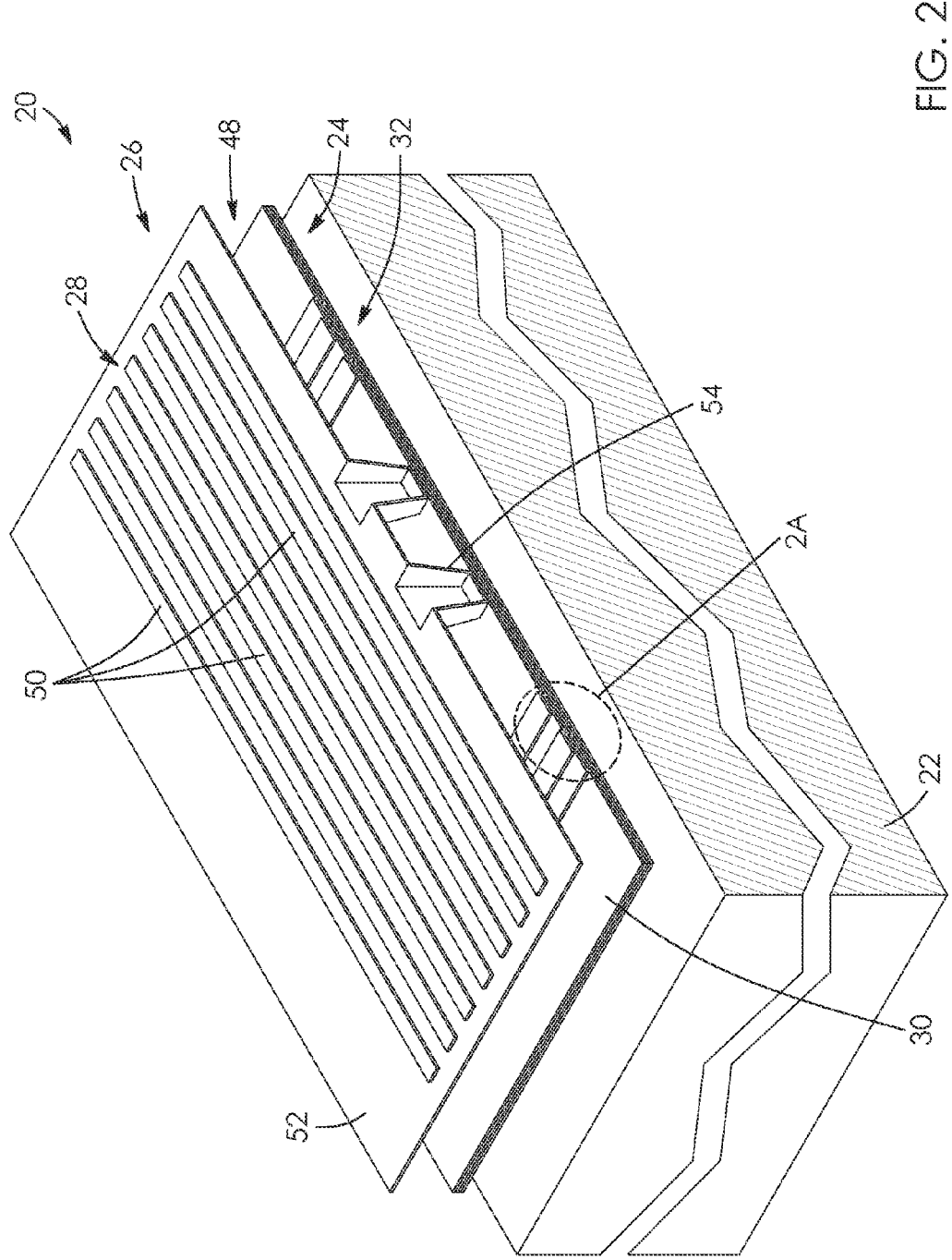
FIG. 2 is a cross-sectional perspective view of the uncooled microbolometer pixel of FIG. 1, taken along section line 2.
Figure 3:
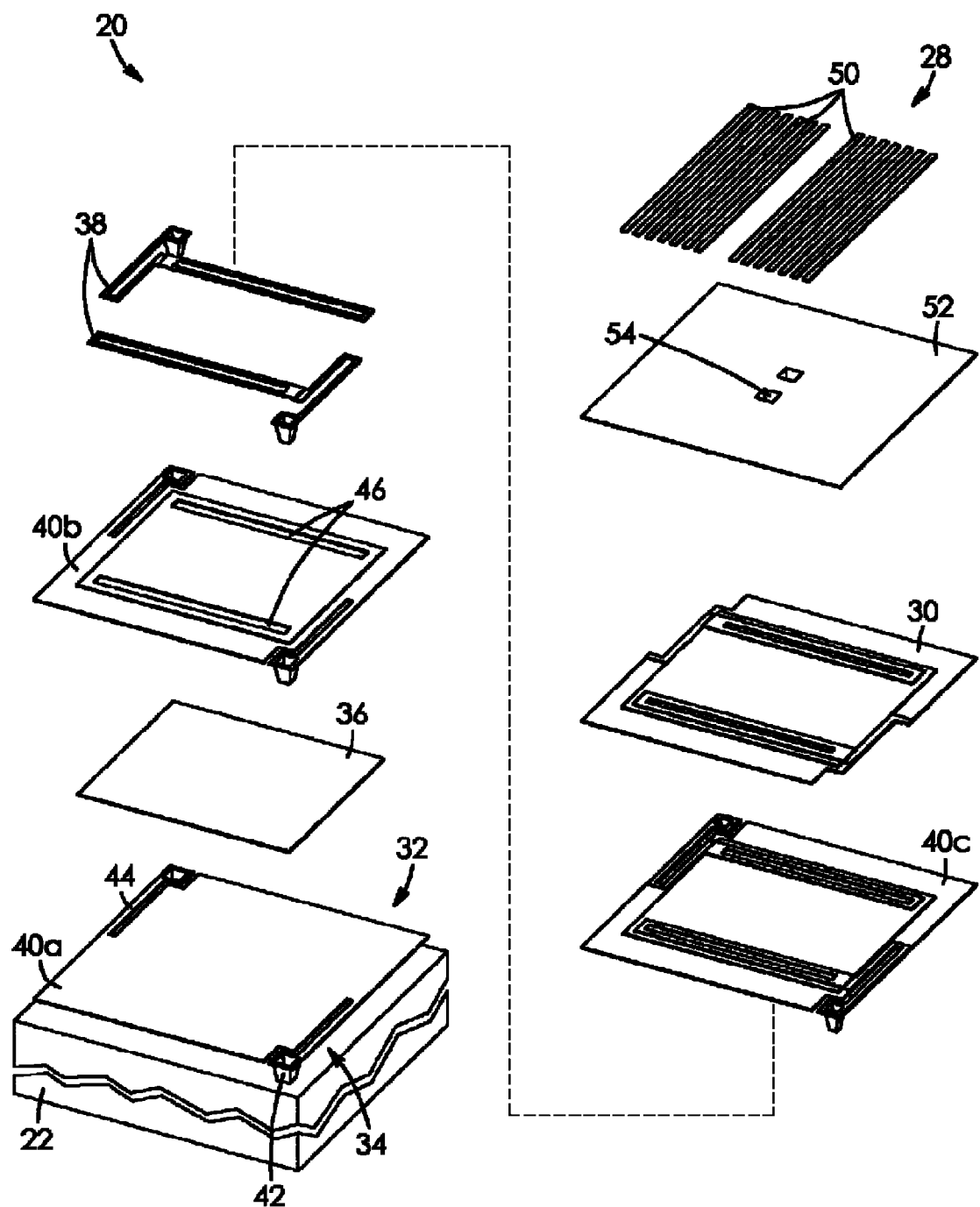
FIG. 3 is a partially exploded perspective view of the uncooled microbolometer pixel of FIG. 1.

In accordance with an aspect of the invention, there is provided an uncooled microbolometer pixel 20 for detecting electromagnetic radiation, a first exemplary embodiment of which is illustrated in FIGS. 1 to 3. The microbolometer pixel 20 includes a substrate 22, a thermistor assembly 24, and an absorber assembly 26 provided with an optical absorber 28 and a reflector 30. Each of these components will be described in greater detail below.

Substrate

The substrate 22 may be made of silicon (Si), silicon carbide (SiC), gallium arsenide (GaAs), germanium (Ge) or any other suitable substrate material that may, but need not, support integration of semiconductor devices. The substrate 22 may be provided with an electrical ROIC embodied, for example, by one or more CMOS circuitry layers formed on or in the substrate 22 according to conventional CMOS processes. Alternatively, the electrical ROIC may be provided outside of the substrate 22. The substrate 22 may be a multilayered structure made of several dielectric, semiconductor and metallic layers including, but not limited to, the reflector 30 (see, e.g., FIGS. 5 to 10), one or more protective dielectric layers, and electrical contacts for electrical connection with the ROIC.

Thermistor Assembly

In the embodiment of FIGS. 1 to 3, the thermistor assembly 24 includes a thermistor platform 32 suspended above the substrate 22 by a support structure 34, at least one thermistor 36 on the thermistor platform 32, and an electrode structure 38 electrically connecting the at least one thermistor 36 to the substrate 22.

As used herein, the term "platform" generally refers to a substantially planar and rigid suspended structure or membrane, typically having greater horizontal dimensions than vertical thickness. In this regard, it is noted that throughout the present description, the terms "vertical" and variants thereof refer to a direction perpendicular to a plane parallel to the conventional plane or surface of the substrate. Likewise, the terms "horizontal" and variants thereof are used to refer to directions lying in a plane which is perpendicular to the vertical direction as just defined. Both terms are not meant to refer to a particular orientation of the microbolometer pixel. Similarly, terms such as "above" and "below", "over" and "under", "upper" and "lower", "top" and "bottom", and other like terms indicating the position of one element with respect to another element are used herein for ease and clarity of description, as illustrated in the figures, and should not be considered limitative. It will be understood that such spatially relative terms are intended to encompass different orientations of the microbolometer pixel in use or operation, in addition to the orientation exemplified in the figures.

The thermistor platform 32 preferably provides thermal isolation to each thermistor 36 by minimizing heat transfer through thermal conduction (except through posts and arms of the support structure 34). The thermistor platform 32 may be shaped as a substantially rectangular single or multilayer thin film, and be made of an electrically insulating, mechanically self-supportive and low-stress material. Suitable materials for inclusion in the thermistor platform 32 can include, without limitation, silicon nitride and silicon dioxide. In some embodiments, the thermistor platform 32 may have horizontal dimensions selected between about 10 and 1000 μm, and it may have a vertical thickness selected in the range of about 0.1 to 1 μm.

The thermistor platform 32 may generally be formed on top of a sacrificial layer (not shown), which may be deposited on the substrate 22 during the fabrication process of the microbolometer pixel 20, and be subsequently patterned, selectively etched, for example in an oxygen plasma.

Figure 2A:
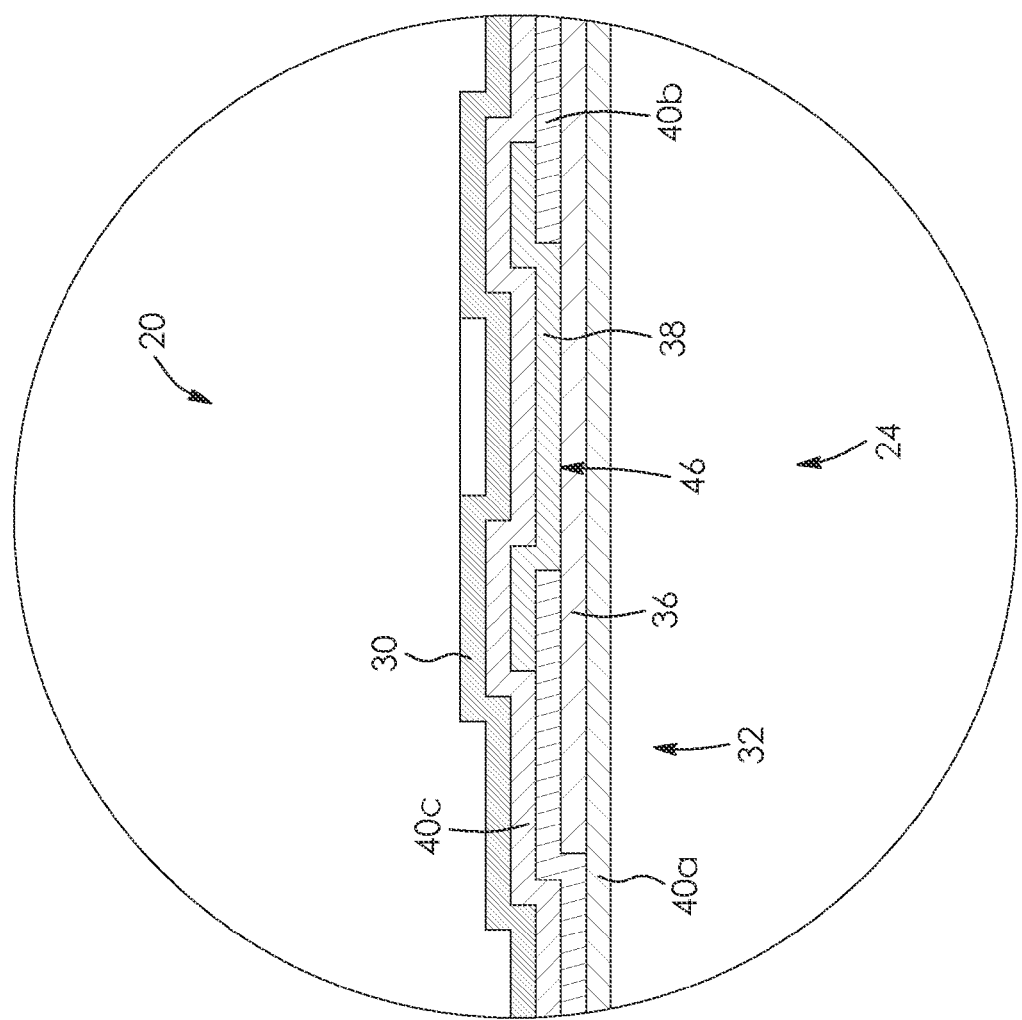
FIG. 2A is an enlargement of portion 2A of FIG. 2.

As illustrated in FIGS. 2A and 3, in an exemplary embodiment, the thermistor platform 32 includes three vertically stacked dielectric layers 40a to 40c. These three dielectric layers 40a to 40c provide mechanical rigidity and an electrical separation between the at least one thermistor 36, the electrode structure 38, and the reflector 30 (or the optical absorber 28, as in FIGS. 7 and 10). However, it will be understood that depending on the intended application of the microbolometer pixel 20, the thermistor platform 32 may take a variety of shapes, dimensions and configurations without departing from the scope of the invention.

It is to be noted that, in contrast to common uncooled infrared microbolometer pixels whose absorption waveband is determined essentially by the infrared absorption properties of the material making up the thermistor platform (e.g., silicon nitride), in embodiments of the invention, the absorption spectrum of the microbolometer pixel is primarily defined by that of the optical absorber, as described in greater detail below. As a result, the thermistor platform is primarily intended for supporting and providing thermal isolation to the one or more thermistors.

The term "support structure" as used herein refers broadly to a structure that holds and mechanically supports the thermistor platform of the microbolometer pixel in a spaced relationship above the substrate.

Referring back to FIGS. 1 to 3, it may be advantageous for the support structure 34 to provide enough mechanical rigidity and strength to maintain the thermistor platform 32 at a height of between about 1 and 10 μm from the substrate 22. It will also be understood that, in addition to providing mechanical support and thermal isolation, the support structure 34 can also provide a path to the electrode structure 38 for electrically connecting each thermistor 36 to the ROIC in the substrate 22, for example by means of an electrically conductive contact pad 72 formed at the surface of the substrate 22 (see FIGS. 7 and 10).

The support structure 34 generally includes posts 42 and arms 44. As used herein, the term "post" refers generally to a structural element of the support structure that extends mainly vertically along a height thereof from the substrate. In particular, the height of each post essentially defines the spacing between the thermistor platform and the substrate. In contrast, the term "support arm" refers broadly to a structural element of the support structure that extends mainly horizontally.

As for the thermistor platform 32, the support structure 34 is preferably made of a low-stress and self-supporting material, for example silicon nitride or silicon dioxide, which may be provided in the form of one or more thin-film layers, having for example a thickness of about 0.1 to 1 μm. The support structure 34 is generally fabricated concurrently with the thermistor platform 32, such that the support structure 34 and thermistor platform 32 may share one or more material layers. In the illustrated embodiment, the support structure 34 is generally disposed along an outer perimeter of the thermistor platform 32. The support structure 34 includes two posts 42 connected to and projecting substantially vertically from the substrate 22.

Each post 42 includes a proximal end connected to the substrate 22 and a distal end terminating near the outer perimeter of the thermistor platform 32 and connected to a support arm 44.

Figure 5:
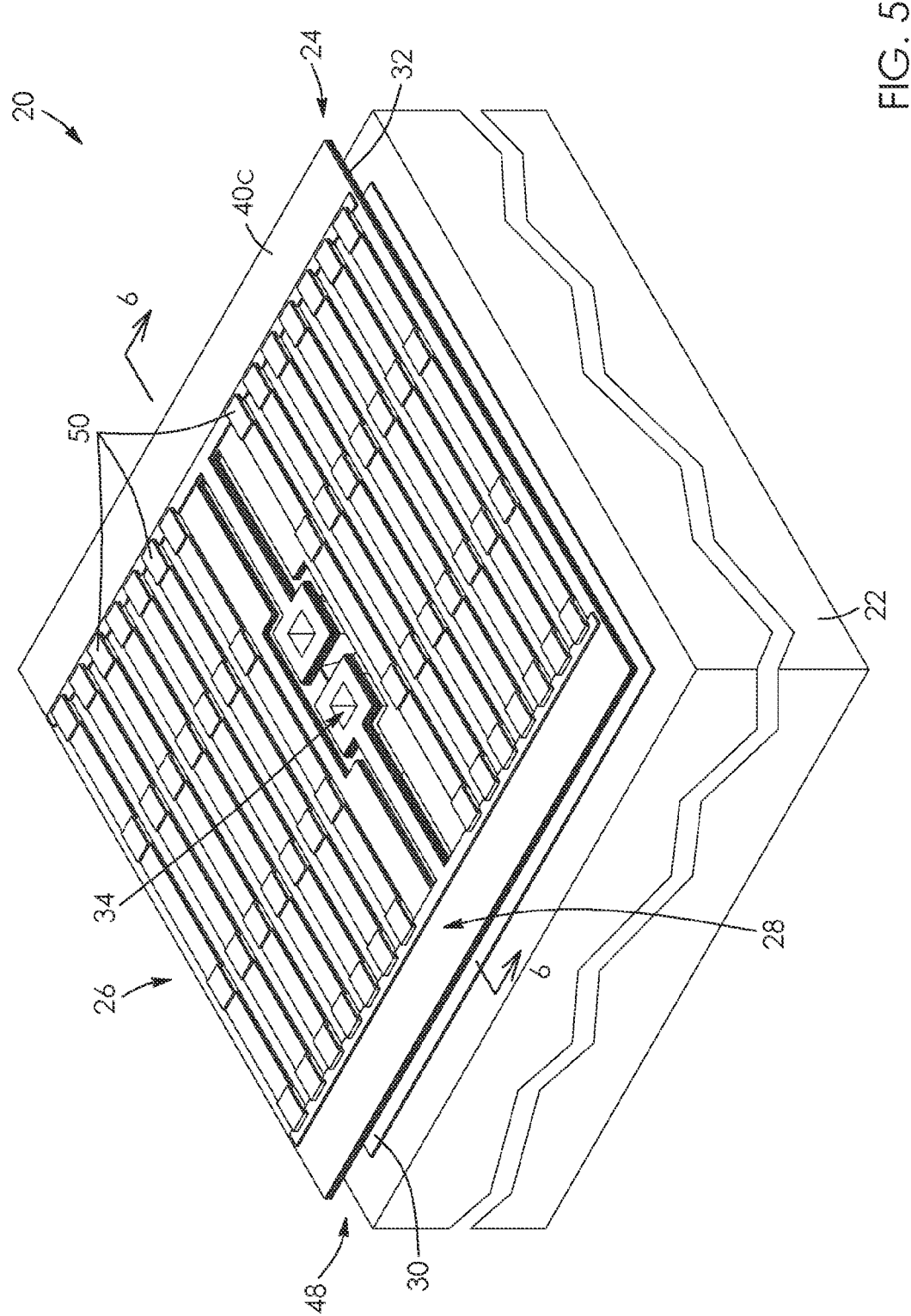
FIG. 5 is a schematic perspective view of an uncooled microbolometer pixel, in accordance with another embodiment.
Figure 7:
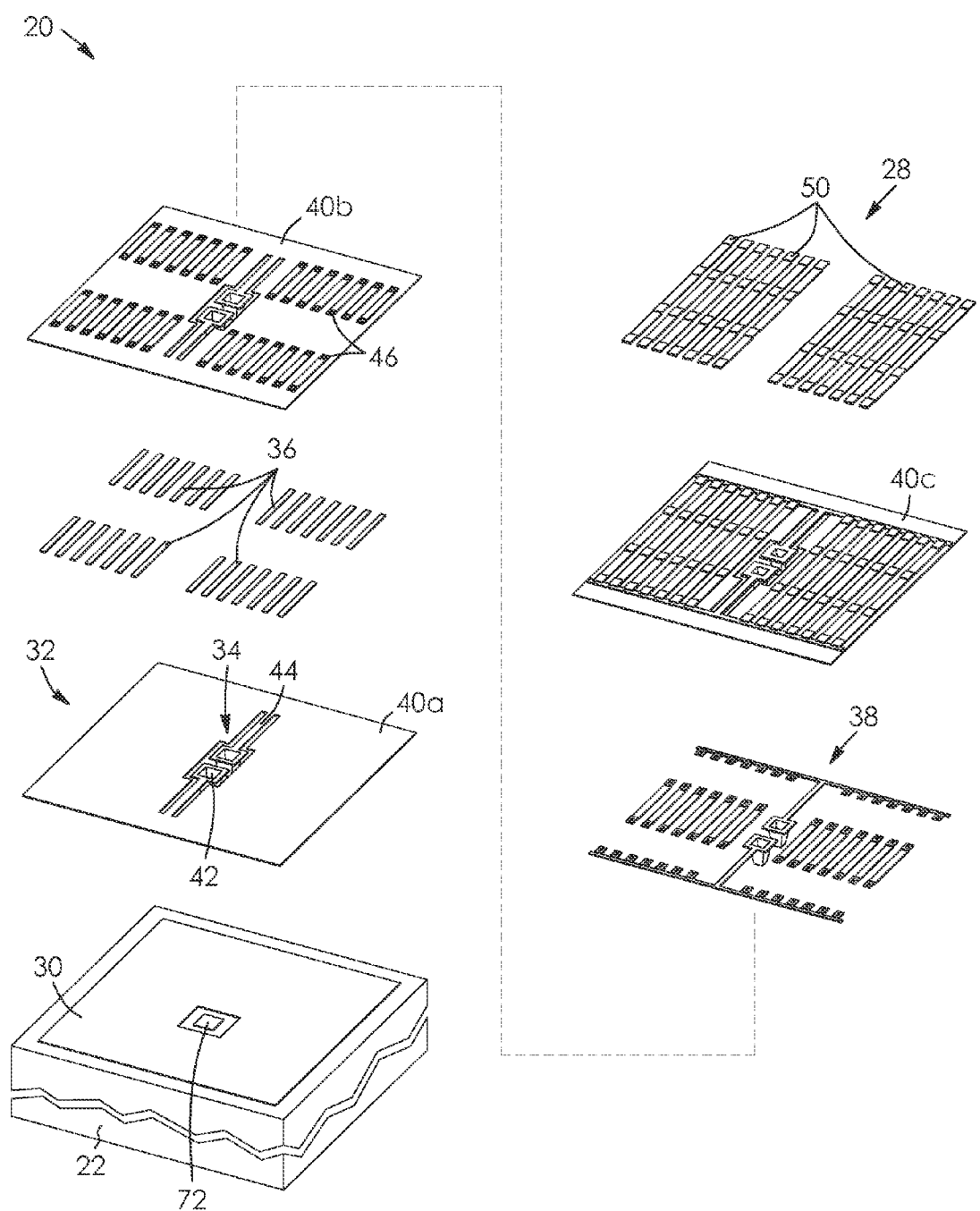
FIG. 7 is a partially exploded perspective view of the uncooled microbolometer pixel of FIG. 5.

However, those skilled in the art will understand that the general configuration and disposition of the support structure 34 can be varied in other embodiments. For example, in order to meet the thermal, mechanical and electrical constraints of certain applications, each post 42 of the support structure 34 may have a variety of lengths, cross-sectional shapes and dimensions, which are all considered to be within the scope of the present invention. Similarly, the support structure 34 need not be provided outwardly of the thermistor platform 32 but may be disposed completely or partially underneath the thermistor platform 32, as shown in FIGS. 5 to 7. In microbolometer pixel arrays, such configurations may provide a higher fill factor for optical absorption while simultaneously mitigating diffraction effects. Furthermore, the support arms 44 need not be straight, but may also include transverse sections and be arranged according to meandering or serpentine configurations. Such geometric patterns allow increasing the effective length of the support arms 44 and, hence, the thermal isolation they provide to the thermistor platform 32 and to one or more thermistors 36 provided thereon.

As used herein, the term "thermistor" generally refers to an uncooled thermally sensitive resistor and is meant to encompass any suitable material, structure or device having an electrical resistance that changes as a function of its temperature, ideally in a predictable and controllable manner.

Referring to FIGS. 2A and 3, each thermistor 36 may be made of a material having a high TCR near room temperature, preferably of at least 0.5% per kelvin, including but not limited to a vanadium oxide material and an amorphous silicon material. Of course, the composition of each thermistor 36 is not limited to those cited above. Any material or combination of materials having a suitable TCR is considered to be encompassed within the scope of the present invention.

In FIGS. 2A and 3, the microbolometer pixel 20 includes a single thermistor 36 disposed on the thermistor platform 32 between the first and second dielectric layers 40a and 40b, and embodied by a thin film element having a substantially rectangular shape with a width, length and thickness which may be selected according to a desired electrical resistance of the thermistor 36. Of course, the number, size, shape and arrangement of the one or more thermistors 36 may be varied without departing from the scope of the invention, as exemplified in the embodiments of FIGS. 7 and 10. The thermistors 36 may be deposited onto the thermistor platform 32 using common deposition techniques such as evaporation, sputtering, spin coating or any other appropriate thin-film transfer technique. Likewise, the size, shape and disposition of each thermistor 36 may be subsequently delineated by means of various selective wet and dry etching techniques combined with photolithographic processes.

Referring still to FIGS. 2A and 3, the electrode structure 38 provides an electrical connection between the thermistor 36 and the substrate 22. For example, in the illustrated embodiment, the electrode structure 38 may establish electrical contact with the thermistor 36 via contact openings 46 defined in the second dielectric layer 40b forming the thermistor platform 32 and may extend along the support arms 44 and posts 42 down to the substrate 22. As mentioned above, the substrate 22 may include an electrical ROIC electrically connected to the electrode structure 38, for example by means of contact openings 46 lithographically defined at the bottom of each post 42 during the fabrication process of the microbolometer pixel 20.

The electrode structure 38 may be deposited and delineated using known microfabrication techniques and may be made of any material having a suitable electrical conductivity including, without limitation, gold, aluminum, titanium, copper, silver, tungsten, chrome and vanadium. In the illustrated embodiment (see FIGS. 2A and 3), the third dielectric layer 40c of the thermistor platform 32 is deposited over the electrode structure 38. It will be appreciated that the geometry of the electrode structure 38 may be adjusted to procure a thermal conductance and an electrical resistance that optimize the performance of the microbolometer pixel 20. In particular, in embodiments provided with more than one thermistor 36, it may be possible to adjust the equivalent resistance of the thermistors 36 by connecting the thermistors 36 in one of a series, parallel and series-parallel circuit schemes.

Absorber Assembly

Referring to FIGS. 1 to 3, the absorber assembly 26 includes an optical absorber 28 over the thermistor assembly 24 and a reflector 30 provided under the optical absorber 28. The optical absorber 28 and the reflector 30 together form a resonant cavity 48. The optical absorber 28 is in thermal contact with the at least one thermistor 36 and is exposed to the electromagnetic radiation. The optical absorber 28 also includes a set of elongated resonators 50 determining an absorption spectrum of the optical absorber 28.

The term "optical absorber" is intended to refer herein to a material or structure of the microbolometer pixel that can, upon exposure to certain wavelengths of electromagnetic radiation, absorb electromagnetic energy from the incident electromagnetic radiation and convert the absorbed electromagnetic energy into thermal energy. In particular, as mentioned above, the term "optical" refers to the electromagnetic spectrum in general and is not limited to the visible or to another portion of the electromagnetic spectrum.

The term "absorption spectrum" is intended to refer herein to a spectrum of electromagnetic energy over a range of wavelengths whose intensity at each wavelength corresponds to a measure of the fraction of absorbed electromagnetic radiation. A given absorption spectrum may include one or more absorption bands within which electromagnetic radiation is predominantly absorbed. Each absorption band may in turn exhibit one or more absorption peaks, each peak having a corresponding peak or resonance wavelength. As will be discussed further below, in some embodiments of the invention, the absorption spectrum of the optical absorber may exhibit one or more absorption peaks, each of which having a corresponding peak wavelength that is linearly or nearly linearly related to the length of a number of the elongated resonators, at least within a certain range of resonator lengths.

Referring still to FIGS. 1 to 3, in some embodiments, the optical absorber 28 may be optimized for detecting radiation in the terahertz region of the electromagnetic spectrum, while being provided advantageously on a microbolometer pixel 20 having a substrate 22, a thermistor platform 32, a support structure 34 and thermistors 36 that are similar to those found in conventional infrared microbolometer detectors. As used herein the term "terahertz radiation" refers to electromagnetic radiation having wavelengths in a range between about 30 μm and 1000 μm, corresponding to frequencies ranging from approximately 10 THz to 0.3 THz, respectively. However, while particularly useful for terahertz applications, those skilled in the art will appreciate that embodiments of the invention could additionally or alternatively be used in other regions of the electromagnetic spectrum, for example in the infrared and visible regions, without departing from the scope of the invention. It will be understood that as the wavelength of the electromagnetic radiation detected by the microbolometer pixel decreases, the characteristic size of the geometrical parameters of the optical absorber decreases accordingly. In particular, the design of the optical absorber is generally limited mainly by the minimum critical dimension that can be achieved by the fabrication process of the microbolometer pixel.

As used herein, the term "thermal contact" generally means that heat conduction occurs directly or indirectly between two components, that is, the two components may be in direct contact with each other or may have a sufficiently thermally conducting material provided between them. More specifically, the term "thermal contact" is intended to refer to the fact that when the optical absorber is heated upon absorption of electromagnetic radiation, the heat generated thereby is conducted, radiated or otherwise transmitted to the one or more thermistors. It will also be understood that the term "over" in specifying the spatial relationship of the optical absorber relative to the thermistor assembly denotes that the optical absorber is either in direct contact with or separated by one or more intervening elements from the upper surface of the thermistor assembly.

The reflector 30 may be embodied by a thin film providing a radiation reflecting surface. The reflector 30 may be made of aluminum or of another highly reflective metal and be deposited during the fabrication process of the uncooled microbolometer pixel 20. Those skilled in the art will recognize that the reflector 30 can form a resonant cavity 48 with the optical absorber 28 disposed thereover, which serves to enhance absorption of electromagnetic radiation incident on the optical absorber 28 by optimizing the overall impedance of the absorber assembly 26.

The reflector 30 can provide additional absorption by reflecting back toward the optical absorber 28 the electromagnetic radiation which the optical absorber 28 is configured to absorb but which has not been absorbed on its first passage therethrough.

Throughout the present description, the term "elongated resonator" or simply "resonator" is intended to refer to a discrete, individual absorbing element of the optical absorber that is configured to achieve resonance in a certain absorption waveband. In other words, each elongated resonator of the optical absorber is designed in a manner such that electromagnetic radiation within one specific wavelength or frequency band is selectively absorbed while electromagnetic radiation of wavelength or frequency out of the band is mostly unabsorbed by the resonator.

The term "elongated" as used herein refers to a resonator, in which one of the three dimensions, referred to as the "length" or "longitudinal dimension" of the resonator, is many times greater than either of the other two dimensions, referred to as the "transverse dimensions" of the resonator. The ratio between the length and any of the transverse dimensions is known as the "aspect ratio" of the resonator. In an exemplary non-limitative embodiment, a resonator can be deemed to be elongated when its aspect ratio is greater than about ten. For example, and without limitation, in terahertz applications, the length of the resonators can be from about 10 µm to about 350 µm, while the transverse dimensions of the resonators can be from about 2 µm to about 6 µm. In some embodiments, the transverse dimensions of the resonators may be selected so as to remain significantly smaller than the smallest wavelength to be detected in a particular application. This is to prevent or at least reduce undesirable radiation absorption caused by the excitation of a transverse resonator mode oscillating at shorter wavelengths. In other embodiments, the smallest transverse dimensions of the resonators may be selected based on the resolution limits of photolithography techniques.

It is to be noted that the term "elongated" does not refer to a particular transverse cross-sectional shape (i.e., the cross-section extending perpendicularly to the length of the resonator), so that the resonator may be, without limitation, a circular rod, a square or rectangular rod, a tube, a needle, a prolate ellipsoid, or have any other shape as desired. For example, in some embodiments, the elongated resonators consist of monopole-like or dipole-like antennas with large aspect ratios. In some implementations, a monopole-like antenna can consist of a single rod- or wire-shaped conductor (see, e.g., FIG. 1), while a dipole-like antenna can consist of a pair of rod- or wire-shaped conductors coaxially arranged end-to-end, with a load resistor element connecting the two adjacent ends and provided with a value that optimizes performance (see, e.g., FIG. 11A). It is also to be noted that for the optical absorber according to embodiments of the invention, the resonators are generally arranged horizontally, that is, within a plane which is generally parallel to the conventional plane or surface of the substrate, as defined above.

Referring still to FIGS. 1 to 3, the elongated resonators 50 may be made of a metal (e.g., aluminum, gold silver, copper or any other suitable low-resistivity metal), a metal alloy or any other appropriate electrically conductive material or combination thereof. In this regard, the absorption spectrum of each elongated resonator 50 will generally depend, at least to some extent, on its material composition, particularly its electrical conductivity, which can be frequency-dependent and have an influence on the profile of the absorption spectrum. The elongated resonators 50 can be fabricated on the microbolometer pixel 20 by any appropriate etching, patterning or deposition processes, or combinations thereof, including micro-electro-mechanical system (MEMS) surface micromachining techniques. Those skilled in the art will recognize that by virtue of their inherent electrical conductivity, the elongated resonators 50 can absorb electromagnetic radiation according to their respective absorption spectra and transfer the absorbed electromagnetic energy as thermal energy through radiation and thermal conduction. It is also to be noted that in some implementations, the set of elongated resonators may be embodied by a set of elongated slots formed in a layer or sheet of electrically conducting material. In such implementations, the elongated slots are used to sense incident electromagnetic radiation having electric and magnetic fields respectively polarized perpendicular and parallel to the length of the elongated slots.

In some implementations, an advantage of using elongated resonators is that the spectral position of their absorption peak is governed mainly by their length. More particularly, a given elongated resonator has a resonant wavelength which varies, over a certain range of wavelengths, substantially linearly with respect to the resonator length. However, the profile of the absorption spectrum (e.g., its shape, width or amplitude) remains essentially independent of the resonator length. Thus, in such implementations, providing an elongated resonator of a greater or shorter length can essentially result in a translation of the absorption spectrum toward longer or shorter wavelengths, respectively. This simple linear relationship between resonant wavelength and resonant length may be used advantageously in some embodiments to tailor the absorption spectrum of the microbolometer pixel in a less complex and more straightforward manner.

Figure 4:
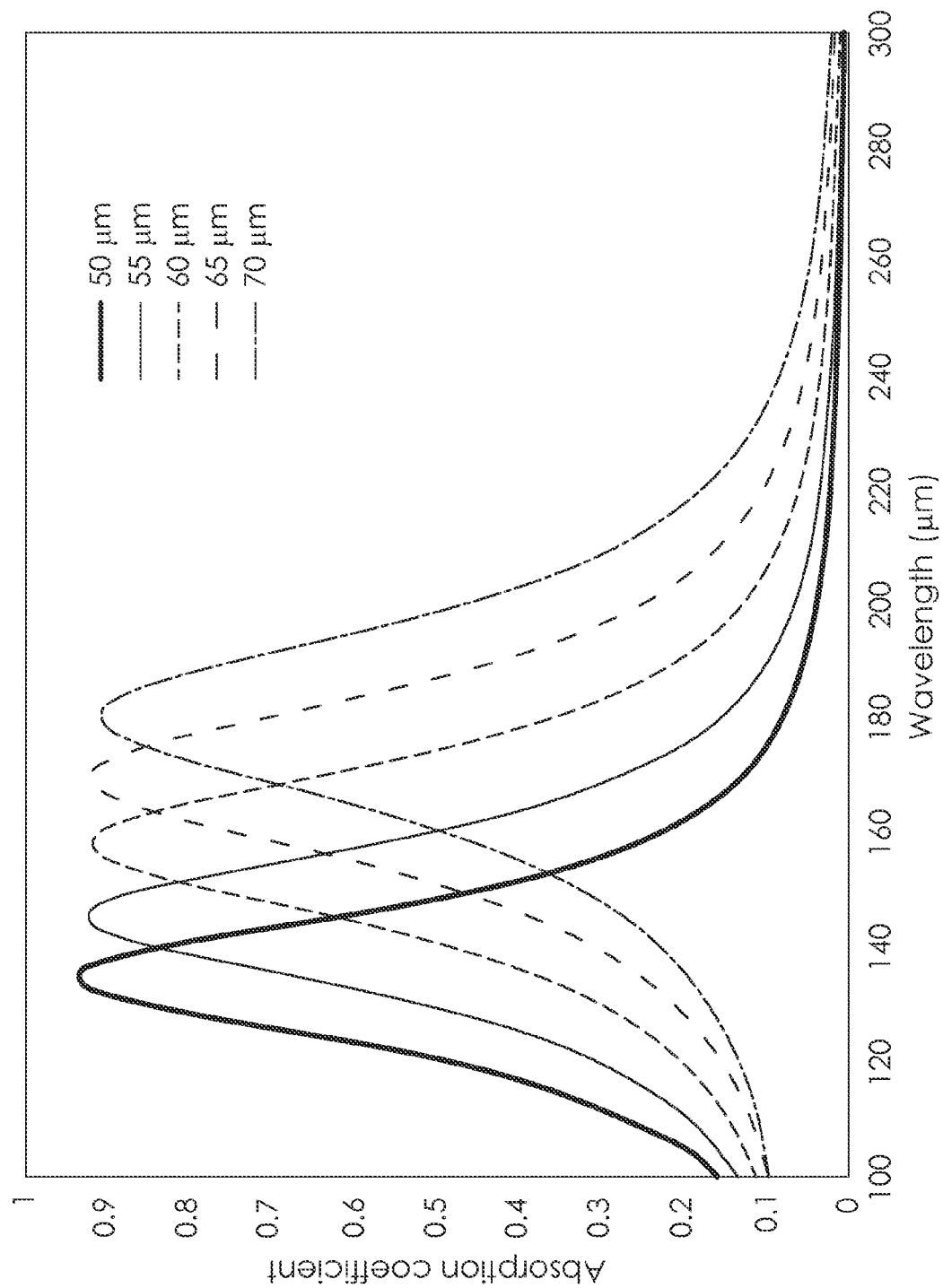
FIG. 4 depicts theoretical absorption spectra plotted as a function of wavelength for different lengths of an elongated resonator consisting of a monopole-like antenna suspended above a perfectly reflecting plane.

Those skilled in the art will recognize that several types of elongated resonators can exhibit a substantially linear variation of resonance wavelength with respect to resonator length. In a non-limitative embodiment, a linear relationship between resonance wavelength and resonator length can be achieved with elongated resonators that consist of high-aspect-ratio monopole-like or dipole-like antennas. For example, FIG. 4 is a theoretical absorption spectra plotted as a function of wavelength of an elongated resonator embodied as a monopole-like antenna suspended above a perfectly reflecting plane and having different lengths. It can be seen from the absorption spectra that as the resonator length increases from 50 µm to 70 µm, the resonance wavelength increases approximately linearly from about 135 µm to 180 µm (corresponding to a decrease in resonance frequency from about 2.20 to 1.65 THz) while the spectral profile remains substantially unaffected.

Referring back to FIGS. 1 to 3, in some implementations of the microbolometer pixel 20, it may be desirable that the absorption spectrum of the optical absorber 28 be as close as possible to a direct superposition of the absorption spectra of the elongated resonators 50. In some embodiments, this can be achieved when the set of elongated resonators 50 is arranged so that there is little or no mutual interaction therebetween such as, for example, capacitive and inductive coupling. In this scenario, the elongated resonators 50 absorb the incident electromagnetic radiation mostly independently from one another, and the resulting absorption spectrum of the optical absorber 28 is more or less determined by the absorption spectra of the individual elongated resonators 50, with minimal or negligible coupling therebetween.

Those skilled in the art will appreciate that an absence or near absence of capacitive and inductive coupling between the elongated resonators 50 can be achieved by ensuring that their separation remains sufficiently large. In such a case, the elongated resonators 50 operate not as a collection of mutually interacting and coupled absorbing elements, but rather as a set of independent and substantially electromagnetically isolated absorbing elements. In other words, in some embodiments of the invention, the absorption spectrum of the whole optical absorber 28 remains representative of the absorption spectra of the discrete, individual elongated resonators 50. It will thus be recognized that the optical absorber 28 as described herein differs from planar two-dimensional meshes of capacitive and inductive grids of closely-spaced metallic elements whose frequency selective properties stem from the mutual interactions and collective resonance of the metallic elements. The response of these grid-based structures generally exhibits a non-linear behavior with frequency, which can render their use in the design of frequency tunable and broadband microbolometer focal plane array more complex. It will also be understood that while, in some embodiments, it may be advantageous in terms of sensitivity to provide a large number of elongated resonators 50 on the optical absorber 28, a sufficient inter-resonator spacing should be maintained to reduce mutual interactions between adjacent resonators 50.

Referring still to FIGS. 1 to 3, in some embodiments, it could therefore be envisioned to design the absorption spectrum of the microbolometer pixel 20 as a whole by proper selection of the length of the elongated resonators 50. However, the absorption spectrum of the microbolometer pixel 20 generally depends not only on the absorption spectrum of the optical absorber 28, but also, typically to a lesser extent and often adversely, on the absorption spectra of other components of the microbolometer pixel 20 also exposed to the electromagnetic radiation.

On the one hand, some of the pixel components can actually enhance the absorption spectrum of the optical absorber 28. This is the case for the reflector 30, which, as mentioned above, forms a resonant cavity 48 with the optical absorber 28. In particular, the absorption spectrum of the cavity 48 is generally related to both the absorption spectrum of the elongated resonators 50 forming the optical absorber 28 and the height of the resonant cavity 48, that is, the vertical spacing between the optical absorber 28 and the reflector 30. It is to be noted that the absorption spectrum of the resonant cavity 48 will generally preserve the linear relationship between resonance wavelength and resonator length. On the other hand, other pixel components, such as the thermistors 36, the electrode structure 38 and the thermistor platform 32, may degrade the absorption spectrum of the microbolometer pixel 20 compared to that of the optical absorber 28, for example by producing peak shifting, lower maximum absorption and unwanted diffraction peaks. These components are therefore generally considered to have a detrimental or undesirable effect on the absorption spectrum of the microbolometer pixel 20 as they tend to make it more difficult to benefit from the linear dependence of the resonant wavelength on resonator length.

Therefore, in order to mitigate the impact of radiation absorption by the thermistor assembly on the absorption spectrum of the microbolometer pixel as a whole, it may be desirable that the absorber assembly, through either or both of the optical absorber and the reflector, shields the thermistor assembly, and particularly the thermistors and the electrode structure, from the incident electromagnetic radiation. Three exemplary, non-limitative implementations of the absorber assembly that can provide such an electromagnetic shielding will now be discussed.

First, in the embodiment of FIGS. 1 to 3, the absorber assembly 26 includes an absorber platform 52 suspended above the thermistor platform 32 in a spaced relationship therewith. The optical absorber 28 is provided on the absorber platform 52 and the reflector 30 extends on the thermistor platform 32 over the at least one thermistor 36 and the electrode structure 38 so that the reflecting surface of the reflector 30 faces the underside of the absorber platform 52. It is seen that in this configuration, both the optical absorber 28 and the reflector 30 contribute to shielding the thermistor assembly 24 from the electromagnetic radiation and, thus, to ensuring that the peak position or positions of the absorption spectrum of the microbolometer pixel 20 are mainly determined by the absorption spectrum of the optical absorber 28.

In FIGS. 1 to 3, the absorber platform 52 is maintained above the thermistor platform 32, for example at a height between about 1 to 10 µm, by a suitable support structure 54. In this embodiment, the support structure 54 includes two pillars projecting upwardly from a central region of the thermistor platform 32. Of course, the configuration and disposition of the support structure 54 supporting the absorber platform 52 can be varied in other embodiments depending on the pixel size, the thermal conductance of the support structure 54 and its mechanical stability. For example, in some embodiments, it may be desirable that the reflector 30 provides a continuous reflecting surface that covers most of or the entire area of the thermistor platform 32 underneath the absorber platform 52 to maximize the back reflection level toward the overlying optical absorber 28. It may also be advantageous that the surface area of the absorber platform 52 be made larger than that of the thermistor platform 32 to provide better shielding of the thermistor platform 32 from the electromagnetic radiation. In some cases where the size of the thermistor platform 32 is significantly smaller than the absorber platform 52, it may be envisioned that the reflector 30 be provided on the substrate 22 rather than on the thermistor platform 32. In such a case, it will be understood that the surface area of the reflector 30 on the substrate 22 would correspond substantially to that of the absorber platform 52.

The absorber platform 52 and its support structure 54 can be made of an electrically insulating, mechanically self-supportive, low-stress and high strength material, for example silicon nitride or silicon dioxide. The absorber platform 52 and its support structure 54 also preferably provide a thermal conductance path between the optical absorber 28 on the absorber platform 52 and the one or more thermistors 36 on the thermistor platform 32 so that when the optical absorber 28 is heated upon absorption of electromagnetic radiation, the heat generated thereby is quickly and efficiently transferred to the one or more thermistors 36. Depending on the thermal requirements of a particular application, the thermal conductance can be enhanced by increasing the number of posts of the support structure 54 or by coating the posts of the support structure with a metallic layer.

Turning now to FIGS. 5 to 7, in a second exemplary implementation, the optical absorber 28 extends over and is in contact with the thermistor platform 32 such that the thermistors 36 and the electrode structure 38 (or at least a substantial portion thereof) each lies under and in vertical alignment with one or more of the elongated resonators 50. Meanwhile, the reflector 30 is disposed on the substrate 22 under the thermistor platform 32. Preferably, the reflector 30 extends over most of or the entire area of the substrate 22 underneath the thermistor platform 32 to maximize the back reflection level toward the overlying optical absorber 28. In this embodiment, it will be understood that the optical absorber 28 acts as a physical barrier that prevents or at least impedes the electromagnetic radiation from reaching the thermistors 36 and the electrode structure 38, and that contributes to ensuring that the peak position or positions of the absorption spectrum of the microbolometer pixel 20 are mainly determined by the corresponding peak position or positions of the absorption spectrum of the optical absorber 28.

Figure 8:
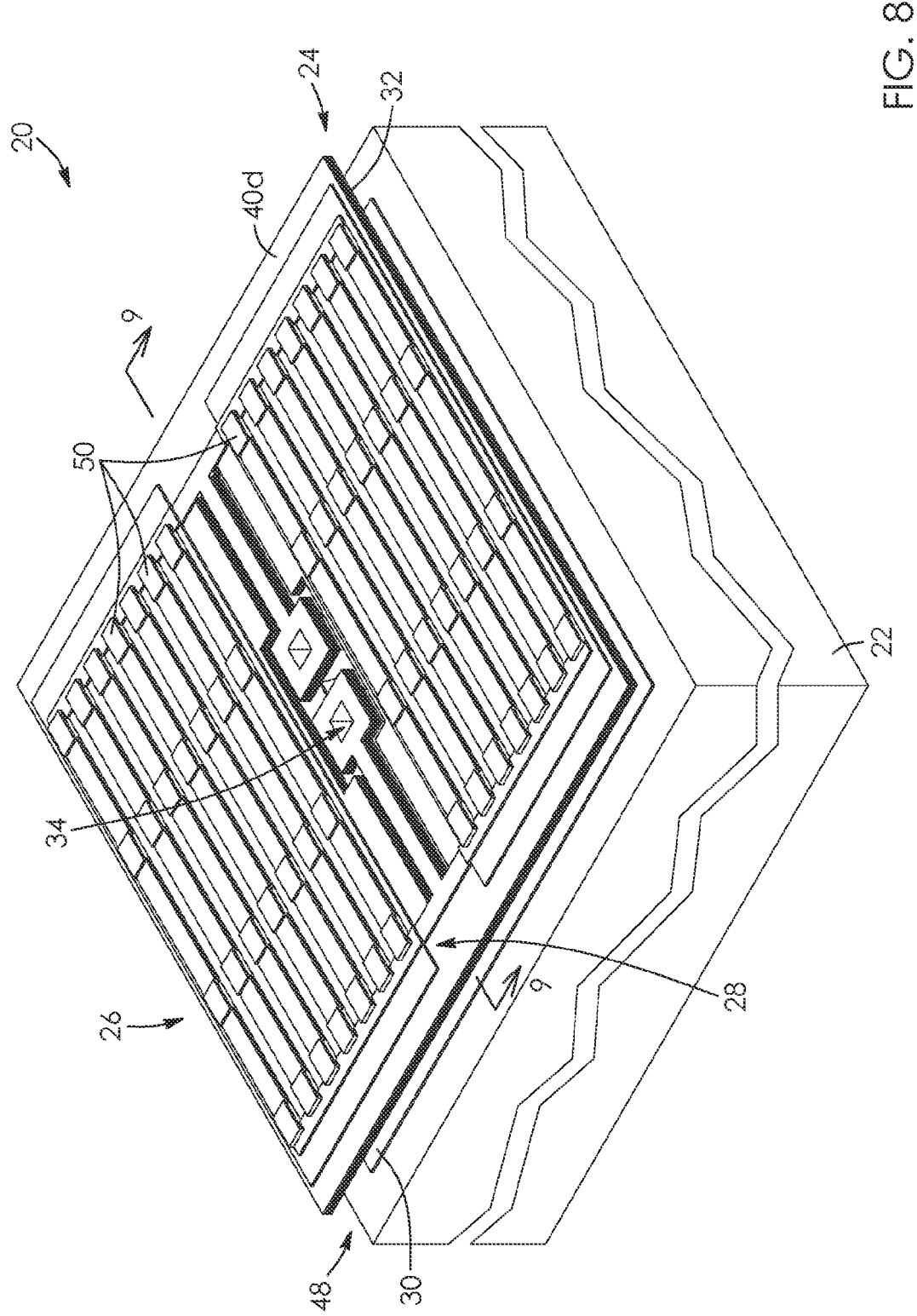
FIG. 8 is a schematic perspective view of an uncooled microbolometer pixel, in accordance with another embodiment.
Figure 9:
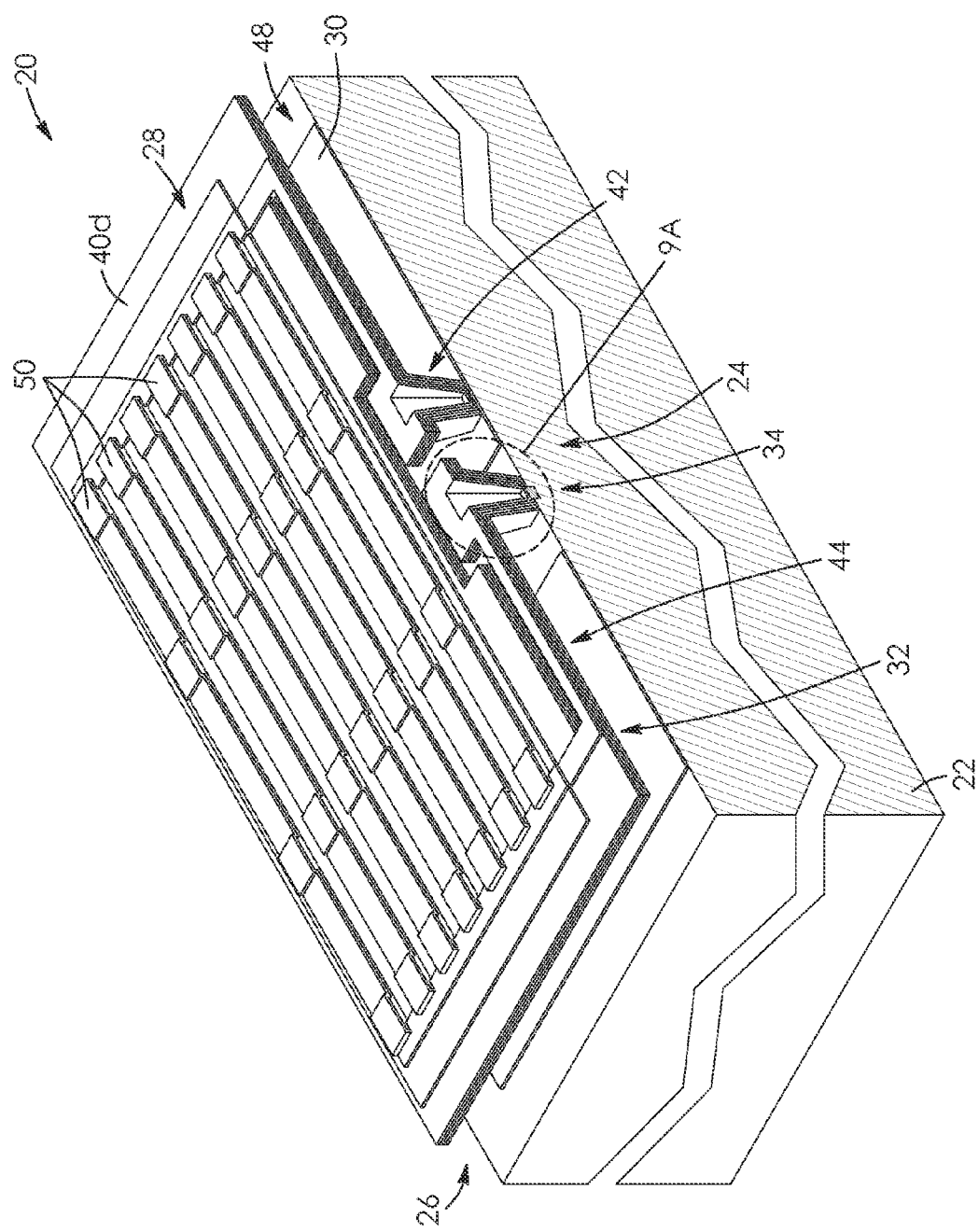
FIG. 9 is a cross-sectional perspective view of the uncooled microbolometer pixel of FIG. 8, taken along section line 9.
Figure 10:
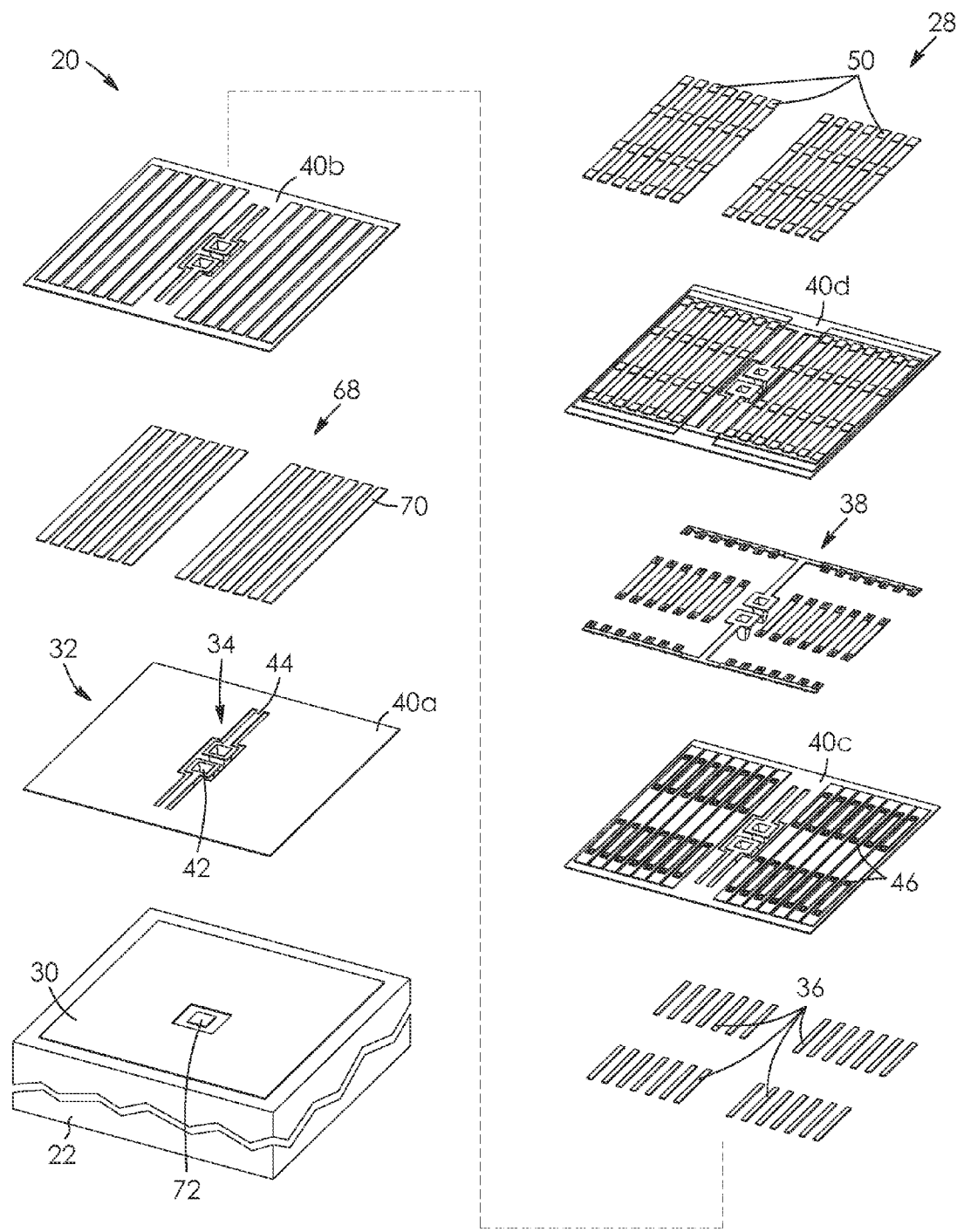
FIG. 10 is a partially exploded perspective view of the uncooled microbolometer pixel of FIG. 8.

Referring to FIGS. 8 to 10, there is illustrated a third exemplary implementation of the absorber assembly 26. The configuration of FIGS. 8 to 10 shares some similarities with the configuration of FIGS. 5 to 7, in that the optical absorber 28 extends over and in contact with the thermistor platform 32 and the reflector 30 is disposed on the substrate 22 under the thermistor platform 32. Again, the reflector 30 preferably extends over most of or the entire area of the substrate underneath the thermistor platform 32. However, in FIGS. 8 to 10, the absorber assembly 26 further comprises an additional optical absorber 68 comprising a set of additional elongated resonators 70. The additional optical absorber 68 extends on the thermistor platform 32 under the thermistors 36 and the electrode structure 38 such that the thermistors 36 and the electrode structure 38 each lies over and in vertical alignment with one or more of the additional elongated resonators 70.

In this embodiment, it will be understood that the additional optical absorber 68 can absorb at least some of the electromagnetic radiation that has not been absorbed on its first passage through the absorber assembly 26 and thermistor assembly 24 and that has been reflected by the reflector 30. The additional optical absorber 68 thus acts as a physical barrier that prevents or at least impedes the electromagnetic radiation reflected by the reflector 30 from reaching the thermistors 36 and the electrode structure 38. It is noted that the number, length and arrangement of the additional elongated resonators 70 of the additional absorber 68 may or may not be identical to those of the elongated resonators 50 of the optical absorber 28. It is also to be noted that due to the provision of the additional absorber 68, the support structure 34 includes four dielectric layers 40a to 40d.

Referring now to FIGS. 11A, 11B and 12A, 12B, different exemplary implementations of the optical absorber 28 will now be described. In particular, it will be seen that by selecting the length and orientation of each elongated resonator 50, and by allowing these two parameters to differ from one resonator to another, the optical absorber 28 can be designed to provide a wavelength- and polarization-selective absorption spectrum, which exhibits one or more absorption peaks in specific regions of the electromagnetic spectrum, for example in the terahertz region.

FIGS. 11A and 11B are respectively a top plan view of an exemplary implementation of the optical absorber 28 and a schematic representation of its absorption spectrum plotted as a function of wavelength. The set of elongated resonators 50 of the optical absorber 28 is divided in three resonator subsets 56a to 56c. Of course, the number of subsets may differ in other embodiments. Also, while all the resonators 50 are parallel to one another, this need not be the case in other embodiments, as will be discussed further below. In FIG. 11A, the elongated resonators 50 from different subsets 56a to 56c have different lengths, thus determining different absorption spectra. Also, in the illustrated embodiment, the elongated resonators 50 consist of dipole-like antennas each of which embodied by a pair of wire-shaped conductors 64a, 64b arranged parallelly in an end-to-end relationship, with a load resistor element 66 connecting the two adjacent ends. Under the assumption that there is little or no mutual interaction between the elongated resonators 50, the absorption spectra of the three resonator subsets 56a to 56c combine, with minimal coupling therebetween, to produce a three-peak absorption spectrum of the optical absorber 28, as depicted in FIG. 11B, where the resonance wavelengths are linearly related to the corresponding resonator lengths. It will be understood that while the three absorption spectra do not overlap appreciably in FIG. 11B, various degrees of overlap can be provided in other embodiments.

Figure 12A:
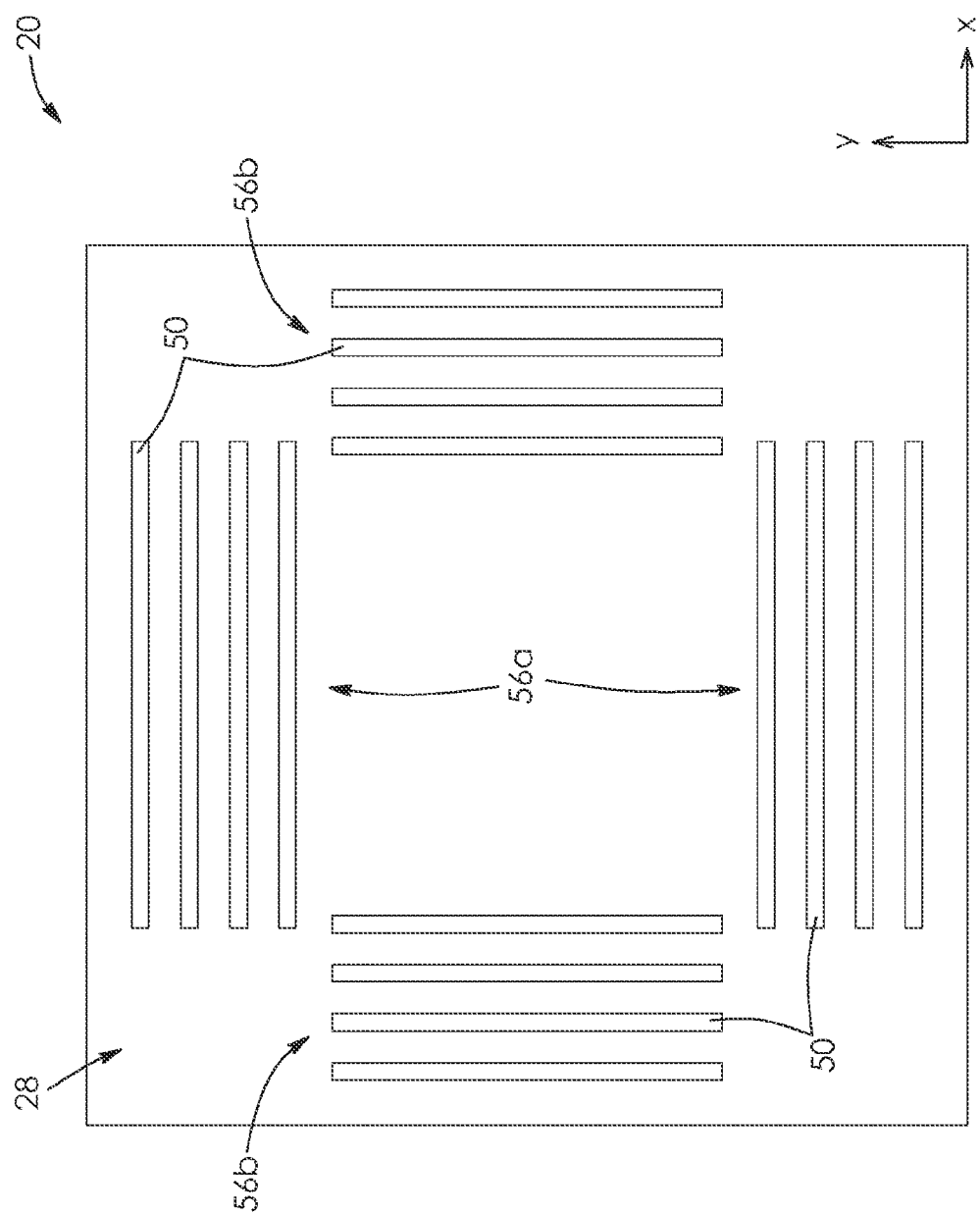
FIG. 12A is a schematic top plan view of an uncooled microbolometer pixel including two subsets of elongated resonators, in accordance with another embodiment. The resonators from different subsets are orthogonal to one another and have different lengths.
Figure 12B:
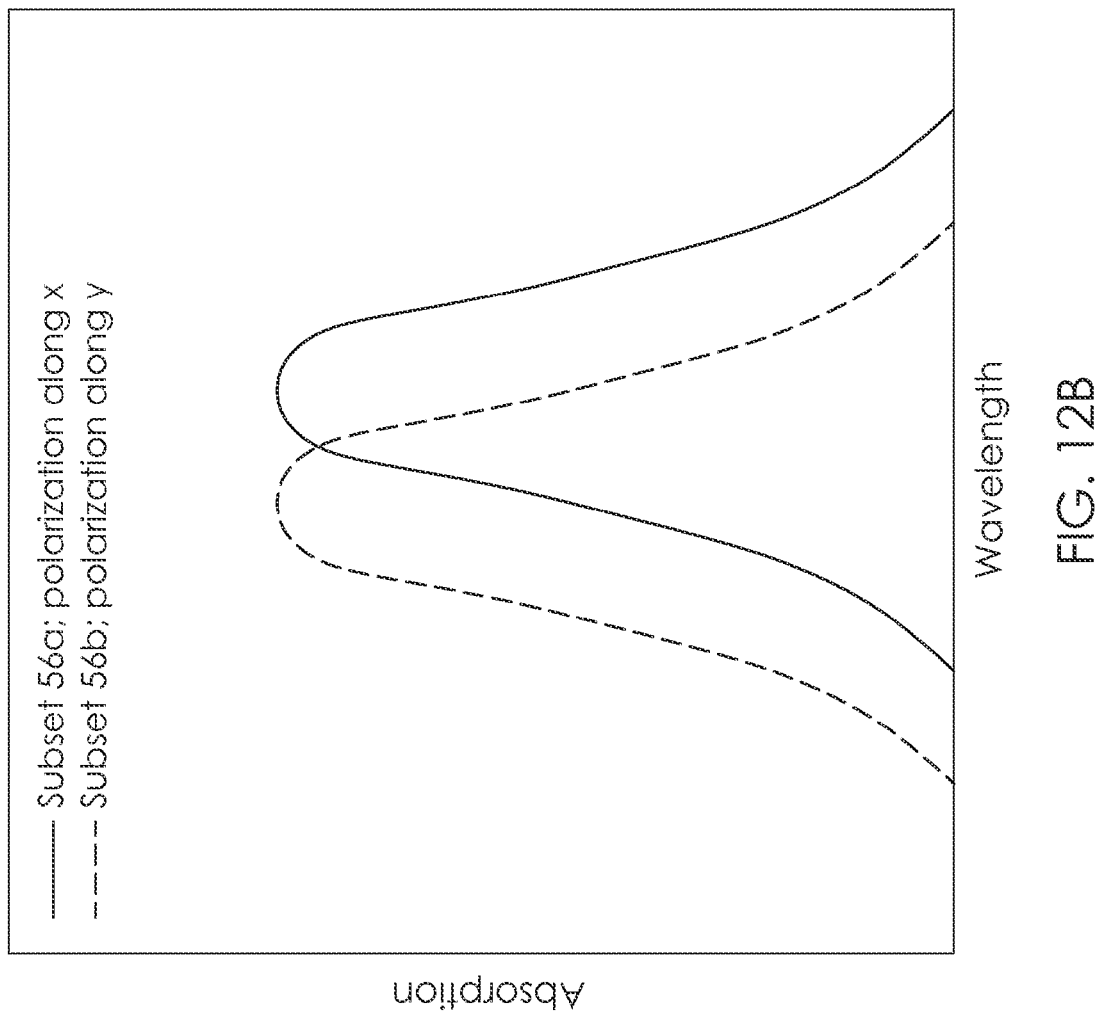
FIG. 12B depicts schematic absorption spectra plotted as a function of wavelength of the optical absorber of the uncooled microbolometer pixel of FIG. 12A, in the case of incident electromagnetic radiation polarized along the x axis (solid line) and along the y axis (dashed line).
Figure 13:
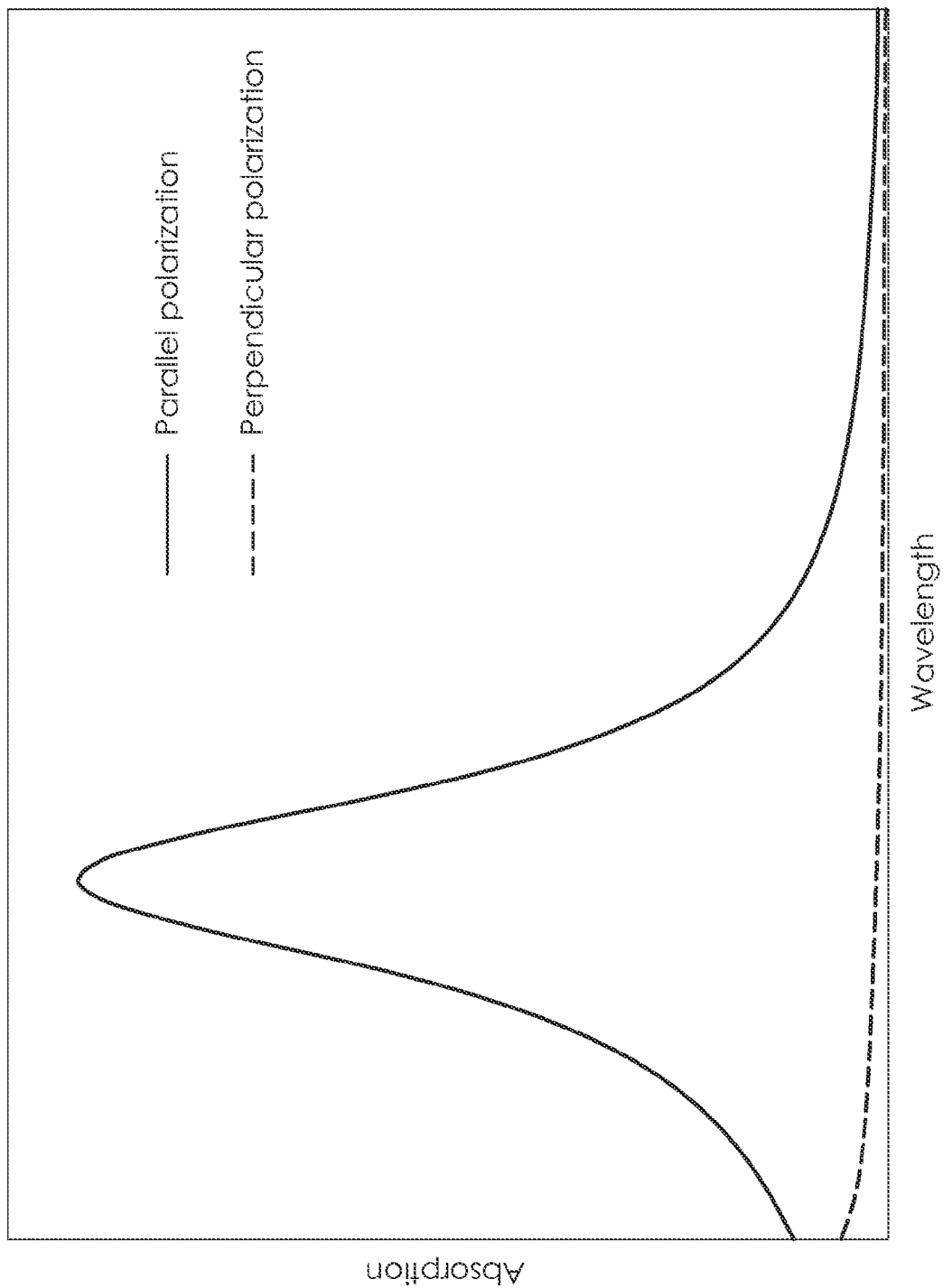
FIG. 13 depicts theoretical absorption spectra plotted as a function of wavelength of an optical absorber including a set of aligned and identical elongated resonators, in the case of parallel polarization (solid line) and perpendicular polarization (dashed line).

Referring to FIGS. 12A and 12B, in some embodiments, the optical absorber 28 may not only have a resonance wavelength that depends linearly on its length, but also be used to selectively absorb components of a linearly-polarized incident electromagnetic radiation. In such a case, the optical absorber 28 can be referred to as "polarization-sensitive". In order to illustrate the effect of polarization sensitivity, FIG. 13 depicts theoretical absorption spectra plotted as a function of wavelength of an optical absorber that includes a set of aligned and identical resonators and that is exposed to electromagnetic radiation polarized along (solid line) and perpendicularly (dashed line) to the resonators. A non-limitative example of such an optical absorber 28 is provided in FIGS. 1 to 3. It is seen that for the range of wavelengths illustrated in FIG. 13, resonant absorption takes place for parallel polarization, while negligible absorption occurs for perpendicular polarization, thereby indicating a preferential absorption of the electromagnetic radiation polarized along the resonators. It will be understood that a microbolometer pixel such as the one depicted in FIGS. 1 to 3 may be used to determine the direction of polarization of linearly-polarized incident electromagnetic radiation by rotating the microbolometer pixel along an axis perpendicular to the plane containing the elongated resonators and by analyzing the variation of the detected signal as a function of the rotation angle.

In FIGS. 12A and 12B, a top plan view of another exemplary implementation of the optical absorber 28 and a schematic representation of its absorption spectrum plotted as a function of wavelength are illustrated, respectively. In this embodiment, each elongated resonator 50 of the optical absorber 28 extends along one of a first and a second orthogonal axis, respectively designated as the x and y axes in FIG. 12A. The resonators 50 are divided in a first subset 56a extending along the x axis and a second subset 56b extending along the y axis, the resonators 50 in different subsets having different lengths. It will be understood that the resonators 50 of the first subset 56a are configured to preferentially absorb a first component of the electromagnetic radiation polarized along the x axis, and that the resonators 50 of the second subset 56b are configured to preferentially absorb a second component of the electromagnetic radiation polarized along the y axis.

The schematic absorption spectra of the optical absorber of FIG. 12A exposed to electromagnetic radiation polarized along the x axis (solid line) and along the y axis (dashed line) are depicted in FIG. 12B. It is seen that the absorption spectrum for electromagnetic radiation polarized along the x axis has an absorption peak at a first resonance wavelength determined by the resonator length associated with the first subset 56a. Likewise, the absorption spectrum for electromagnetic radiation polarized along the y axis has an absorption peak at a second resonance wavelength different from the first resonance wavelength and determined by the resonator length associated with the second subset 56b. Therefore, in the illustrated embodiment the components of the electromagnetic radiation polarized along the x and y axes are resonantly absorbed by the optical absorber 28 at different wavelengths.

It is to be noted that, while the resonator lengths associated with the first and second subsets are different in the embodiment of the FIGS. 12A and 12B, this need not be the case in other embodiments. In particular, it will be understood that a polarization-insensitive optical absorber could be achieved in a configuration where the set of elongated resonators is divided in two subsets of perpendicularly oriented resonators having the same length. In such a case, the components of incident electromagnetic radiation polarized along the two subsets of resonators are resonantly absorbed by the optical absorber at the same wavelength.

In summary, the different configurations of the optical absorber discussed above have been presented for illustrative purposes only and should not be construed so as to limit the scope of the present invention. Indeed, various other configurations could be devised for the optical absorber, depending on the specifics of each application, for example in terms of operating wavelength range, polarization sensitivity or insensitivity, and single- or multi-frequency requirements.

Microbolometer Array

Figure 14:
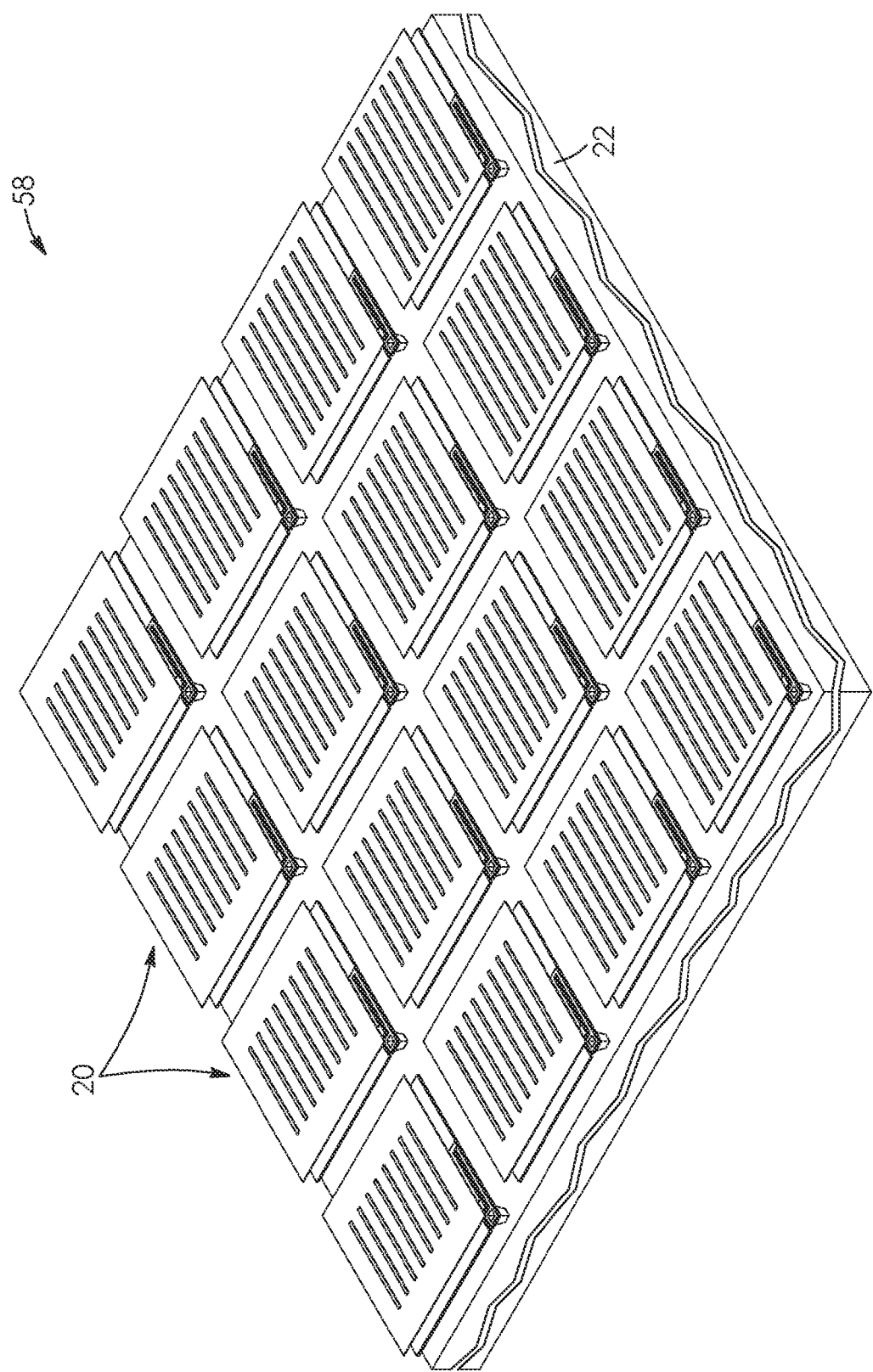
FIG. 14 is a schematic perspective view of a microbolometer array including a plurality of uncooled microbolometer pixels arranged in a two-dimensional matrix of rows and columns, in accordance with an embodiment.

Referring now to FIG. 14, in accordance with another aspect of the invention, there is provided a microbolometer array 58. The microbolometer array 58 includes a plurality of arrayed uncooled microbolometer pixels 20 such as described above. While FIG. 14 depicts a four by four pixel array 58 for clarity, it will be recognized that in other embodiments, the total number of microbolometer pixels 20 in the array 58 could be higher or lower depending on the intended application.

For example, in some embodiments, the microbolometer array 58 may include microbolometer pixels 20 arranged in an array of between 40×30 and 1280×960 pixels, wherein the spacing between two nearest-neighbor microbolometer pixels 20 (e.g., the pixel pitch) may be between about 12 and 312 µm. It should also be noted that, while the microbolometer pixels 20 are arranged to form a two-dimensional array in the embodiments of FIG. 14, they may alternatively be configured as a linear array or be provided at arbitrary locations that do not conform to a specific pattern.

It will be understood that the overall absorption spectrum of the microbolometer array results from the combination, and ideally the direct superposition, of the absorption spectra of its individual pixels. Consequently, providing the array with a certain absorption spectrum can be achieved, in principle, by tailoring the absorption spectra of the individual pixels during fabrication or design. As discussed above, in some embodiments, tailoring the absorption spectra of an individual pixel can, in turn, be accomplished simply by selecting the length and/or orientation of the elongated resonators of that pixel.

In some embodiments, the absorption spectra of the pixels can be designed by selecting the resonator lengths so as to provide an array with a continuous broadband absorption spectrum or an absorption spectrum including a plurality of continuous absorption bands. For example, in a non-limitative embodiment, an array can be designed in which each row or column is configured for absorption at one particular resonant wavelength corresponding to one particular resonator length, so that by combining the relatively narrow responses of each row or column, an array with a broader absorption spectrum can be obtained, for example in the terahertz region.

Figure 15A:
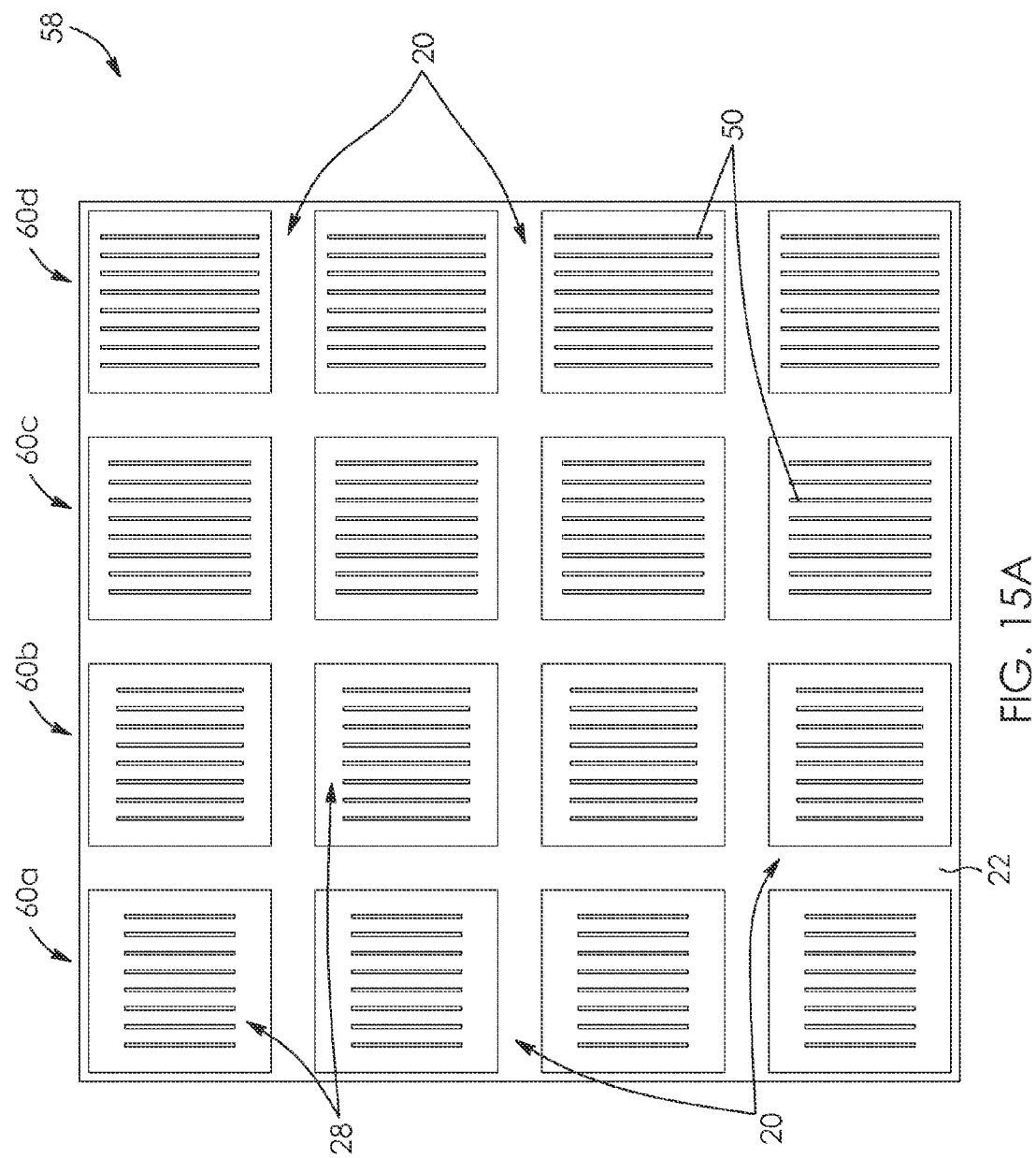
FIG. 15A is a top plan view of the microbolometer pixel array of FIG. 14. The array is divided in four subsets of pixels, each of which corresponding to one particular column of the array. The subsets are designed such that the elongated resonators of the pixels have identical lengths within each subset, but different lengths in different subsets.
Figure 15B:
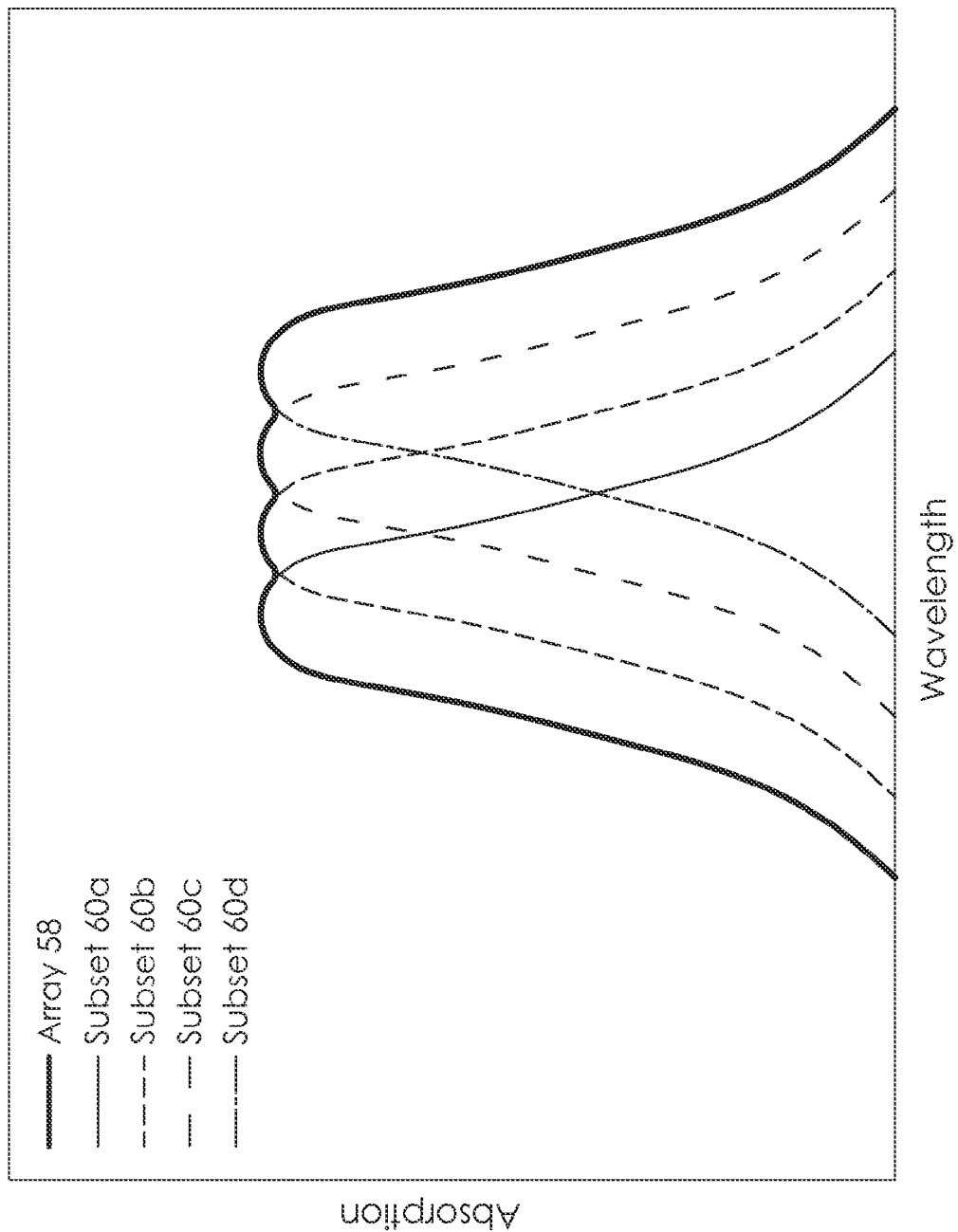
FIG. 15B is a schematic absorption spectrum plotted as a function of wavelength of the microbolometer array of FIG. 15A.
Figure 16B:
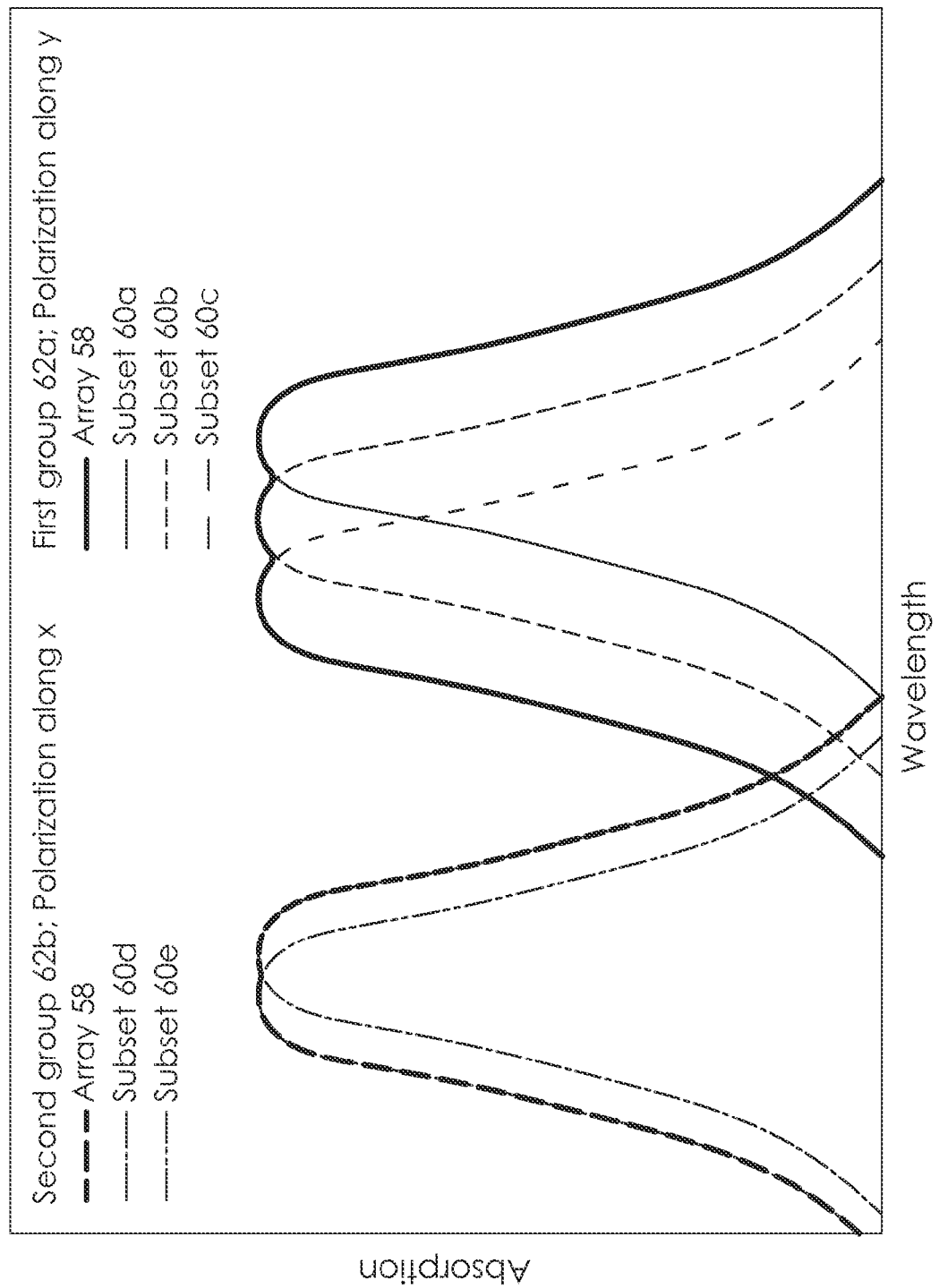
FIG. 16B depicts schematic absorption spectra plotted as a function of wavelength of the microbolometer array of FIG. 16A, in the case of incident electromagnetic radiation linearly polarized along the y axis (thick solid line) and along the x axis (thick dashed line).

Referring to FIGS. 15A, 15B and 16A, 16B, two exemplary embodiments of the microbolometer array 58 will now be described. In both cases, the array 58 includes a plurality of microbolometer pixels 20 arranged in a matrix of rows and columns. It should be noted that, as used herein, the terms "row" and "column" may be used interchangeably depending on the orientation of the array 58. FIGS. 15A and 16A provide top plan views of the two embodiments of the array 58, depicting the length and orientation of the elongated resonators 50 of the optical absorber 28 of each pixel 20, while FIGS. 15B and 16B depict schematic absorption spectra plotted as a function of wavelength of the array 58 of FIGS. 15A and 16A, respectively. It will be seen that each embodiment can provide a broadband absorption spectrum by careful tailoring of the absorption spectra of the individual pixels. As mentioned above, tailoring the absorption spectrum of a given pixel 20 can involve selecting the length and orientation of the elongated resonators 50 for that pixel 20.

First, in the exemplary embodiment of FIGS. 15A and 15B, the pixels 20 of the array 58 are divided in four subsets 60a to 60d of pixels, each of which corresponding to one particular column of the array 58. In particular, the pixels 20 of the array 58 are designed such that the elongated resonators 50 have identical lengths within each subset 60a to 60d, but different lengths in different subsets 60a to 60d, with resonator length increasing going from left to right in FIG. 15A. It will be understood that while, for simplicity, the number of resonators 50 depicted in FIG. 15A is the same for all the pixels 20, this need not be the case in other embodiments. For example, in the case of pixels 20 with shorter resonators 50 (e.g., the leftmost column in FIG. 15A), more resonators 50 could be provided to increase the effective surface of the optical absorber 28 and, thus, contribute to enhancing the absorption of electromagnetic radiation.

As illustrated in FIG. 15B, the pixels 20 within a same column exhibit identical absorption spectra. Meanwhile, the pixels 20 from different columns exhibit different absorption spectra having different resonant wavelengths, where the different resonant wavelengths are linearly related to the different resonator lengths. More particularly, the leftmost absorption spectra in FIG. 15B is associated with the leftmost column in FIG. 15A, the second leftmost absorption spectra in FIG. 15B is associated with the second leftmost column in FIG. 15A, and so on.

The resonator lengths are further selected so that pixels 20 in adjacent columns have different but partially overlapping absorption spectra, as depicted in FIG. 15B. Such a partial overlap can be achieved by selecting resonator lengths that vary gradually enough between adjacent columns to maintain a sufficiently small separation between the corresponding spectra. The partially overlapping spectra from each pair of adjacent columns combine to form a continuous broadband absorption spectrum (thick solid line) of the array 58, which can advantageously exhibit a nearly constant maximum value over a relatively broad wavelength range.

It is to be noted that the broadening of the spectrum of the array 58 compared to that of a pixel 20 remains relatively modest in FIG. 15B, due to the fact that, for simplicity, the array 58 depicted in FIG. 15A includes only four columns of pixels. However, in the case of a more typical array provided with as many as a thousand or more columns, the broadening can be much more important. For example, using the techniques described herein, the absorption spectrum of an array of 80×60 pixels could be broadened to cover a wavelength range between 50 and 300 µm (i.e., from 6 to 1 THz).

It should also be noted that, while the pixels 20 having partially overlapping absorption spectra in FIG. 15B correspond to pixels 20 that are spatially adjacent in the array 58 of FIG. 15A, this need not be the case in other embodiments. In fact, using the techniques described herein, a broadband microbolometer array could be obtained regardless of any relationship between spectrum overlap and pixel proximity, as long as the elongated resonators of a number of pixels have different lengths that determine different absorption spectra whose combinations forms a continuous broadband absorption spectrum. However, it will be understood that providing adjacent pixels with partially overlapping absorption spectra can be advantageous in some situations, for example when the array is employed in two-dimensional spatial scanning applications, such as security screening and spectroscopy applications.

Referring now to the exemplary embodiment of FIGS. 16A and 16B, the pixels 20 of the array 58 are divided in two groups 62*a*, 62*b* of pixels, the first group 62*a* corresponding to the pixels 20 in the left half of the array 58 and the second group 62*b* corresponding to the pixels 20 in the right half of the array 58. The resonators 50 of the pixels 20 in the second group 62*b* are shorter than those of the pixels 20 in the first group 62*a*. Also, due to these shorter lengths, the pixels 20 in the second group 62*b* each include a larger number of resonators 50 than the pixels 20 in the first group 62*a* so as to provide a higher fill factor for optical absorption. As discussed below, for each group 62*a*, 62*b*, the absorption spectra of the pixels 20 of the group combine to form a respective broader, continuous absorption band in the absorption spectrum of the array 58 as a whole. In other words, the absorption spectrum of the array 58 includes two relatively broad absorption bands separated by a spectral transmission window in which absorption is relatively low.

The elongated resonators 50 of the pixels 20 in the first and second groups 62*a*, 62*b* extend along a first and a second orthogonal axis, which are respectively designated as the y and x axes in FIG. 16A. Accordingly, the pixels 20 in the first and second groups 62*a*, 62*b* are configured to predominantly absorb a first and a second component of the electromagnetic radiation polarized along the first and second orthogonal axes, respectively. For this reason, the spectra depicted in FIG. 16B correspond to schematic absorption spectra of the array 58 plotted as a function of wavelength in the case of electromagnetic radiation linearly polarized along the y axis (thick solid line) and along the x axis (thick dashed line), respectively.

In FIG. 16A, the first group 62*a* of pixels 20 is further divided in three subsets 60*a* to 60*c*. The first subset 60*a* includes the four pixels 20 of the first and second rows, the second subset 60*b* includes the two pixels 20 of the third row, and the third subset 60*c* includes the two pixels 20 of the fourth row. The pixels 20 of the first group 62*a* are designed such that the elongated resonators 50 have identical lengths within the same subset, but different lengths in different subsets. Accordingly, the pixels 20 within each subset of the first group 62*a* exhibit identical absorption spectra having identical resonance wavelengths. Meanwhile, the pixels 20 from different subsets exhibit different absorption spectra having different resonant wavelengths, where the different resonant wavelengths are linearly related to the different resonator lengths. In the illustrated embodiment, the resonator lengths and, thus, the resonance wavelengths decrease from the first subset 60*a* to the third subset 60*c*.

The resonator lengths are further selected so that the pixels 20 in the first and second subsets 60*a*, 60*b* have partially overlapping absorption spectra, and likewise for the second and third subsets 60*b*, 60*c*. As in the embodiment of FIG. 15B discussed above, this partial overlap can be achieved by selecting the resonator lengths so they vary sufficiently slowly between the first and second subsets 60*a*, 60*b* and between the second and third subsets 60*b*, 60*c* to maintain a sufficiently small separation between the corresponding spectra. The partially overlapping spectra from the pixels 20 of the three subsets 60*a* to 60*c* of the first group 62*a* combine to form a continuous and broader absorption band (thick solid line) in the absorption spectrum of the array 58, which can advantageously exhibit a nearly constant maximum value over a relatively broad wavelength range.

In FIG. 16A, the second group 62*b* of pixels 20 is divided in two subsets 60*d*, 60*e*, which include the pixels 20 of the third and fourth columns of the array 58, respectively. The pixels 20 of the second group 62*b* are designed such that the elongated resonators 50 have identical lengths within the same subset (and thus identical absorption spectra), but different lengths in different subsets (and thus different resonant wavelengths). The resonator lengths are further selected so that the pixels 20 in the first and second subsets 60*d*, 60*e* have partially overlapping absorption spectra, which can be achieved by selecting the resonator lengths in the first and second subsets 60*d*, 60*e* to be sufficiently close to each other. The partially overlapping spectra of the two subsets 60*d*, 60*e* of pixels 20 combine to form another continuous and broader absorption band (thick dashed line) in the absorption spectrum of the array 58.

Those skilled in the art will appreciate that the two embodiments of the microbolometer array described above have been presented for illustrative purposes only, and should not be construed so as to limit the scope of the present invention. Indeed, various other design rules could be used by which the absorption spectrum of each individual pixel is tailored for absorption at specific wavelength and/or polarization in order to provide a microbolometer pixel array with a broadband or multi-band, wavelength- and/or polarization-selective absorption spectrum, in particular in the THz region.

For example, while the elongated resonators 50 within each individual pixel 20 are assumed, for simplicity, to be parallel and identical to one another in FIGS. 15A and 16A, they could be allowed to differ, both in length and orientation, in other embodiments (see, e.g., the pixels depicted in FIGS. 11A and 12A). Also, while the arrays 58 depicted in FIGS. 15A and 16A include different groups of pixels, in other embodiments, an array where all the pixels are identical and have identical absorption spectra could also be used without departing from the scope of the invention. Depending on the intended application, the microbolometer array may be configured so that the absorption spectrum of each individual pixel, row or column of pixels, or groups or clusters of pixels is independently tailored during fabrication or design. In particular, many configurations in terms of the length and orientation of the elongated resonators are possible and useful in practicing the techniques described herein. For example, an array with a broadband or multi-band absorption spectrum can be obtained by tailoring the resonator length within each pixel or row, column or group of pixels for absorption at one particular wavelength with a relatively narrow bandwidth. Alternatively or additionally, an array with either a polarization-sensitive or insensitive absorption spectrum can be designed by carefully selecting the orientation of the elongated resonators within each pixel.

Of course, numerous modifications could be made to the embodiments described above without departing from the scope of the present invention.

The invention claimed is:

1. An uncooled microbolometer pixel for detection of electromagnetic radiation, the uncooled microbolometer pixel comprising:
    a substrate;
    a thermistor assembly comprising a thermistor platform suspended above the substrate in a spaced relationship therewith, at least one thermistor on the thermistor platform, and an electrode structure electrically connecting the at least one thermistor to the substrate; and
    an absorber assembly comprising:
    an absorber platform suspended above the thermistor platform in a spaced relationship therewith, the absorber platform overlying the at least one thermistor and the electrode structure;
    an optical absorber provided on the absorber platform, the optical absorber being in thermal contact with the at least one thermistor and exposed to the electromagnetic radiation, the optical absorber comprising a set of elongated resonators determining an absorption spectrum of the optical absorber; and
    a reflector extending on the thermistor platform over the at least one thermistor and the electrode structure, the reflector and the optical absorber together forming a resonant cavity and shielding the at least one thermistor and the electrode structure from the electromagnetic radiation.

2. The uncooled microbolometer pixel according to claim 1, wherein the elongated resonators of the optical absorber consist of monopole-like or dipole-like antennas.

3. The uncooled microbolometer pixel according to claim 1, wherein each of the at least one thermistor is made of a material comprising one of vanadium oxide and amorphous silicon.

4. The uncooled microbolometer pixel according to claim 1, wherein the elongated resonators are parallel to one another.

5. The uncooled microbolometer pixel according to claim 1, wherein each elongated resonator of the optical absorber extends along one of a first and a second orthogonal axis.

6. The uncooled microbolometer pixel according to claim 5, wherein the set of elongated resonators is divided in a first and a second subset of elongated resonators extending along the first and second orthogonal axes and configured to absorb a first and a second component of the electromagnetic radiation polarized along the first and second orthogonal axes, respectively.

7. The uncooled microbolometer pixel according to claim 6, wherein the elongated resonators of the first subset have a first length determining a first resonance wavelength of the absorption spectrum of the optical absorber, and the elongated resonators of the second subset have a second length determining a second resonance wavelength of the absorption spectrum of the optical absorber, the second length and the second resonance wavelength being different from the first length and the first resonance wavelength, respectively.

8. The uncooled microbolometer pixel according to claim 1, wherein the set of elongated resonators is divided in a number of subsets of elongated resonators, the elongated resonators from each subset having different lengths determining different absorption spectra.

9. A microbolometer array comprising a plurality of arrayed uncooled microbolometer pixels according to claim 1.

10. The microbolometer array according to claim 9, wherein the elongated resonators of different ones of the uncooled microbolometer pixels have different lengths determining different absorption spectra.

11. The microbolometer array according to claim 9, wherein the plurality of uncooled microbolometer pixels is arranged in a matrix of rows and columns, and wherein, for each column, the uncooled microbolometer pixels have substantially identical absorption spectra, the elongated resonators of uncooled microbolometer pixels of adjacent columns having different lengths determining different but partially overlapping absorption spectra.

12. The microbolometer array according to claim 10, wherein a combination of the absorption spectra of the plurality of uncooled microbolometer pixels forms a continuous broadband absorption spectrum of the microbolometer array.

13. The microbolometer array according to claim 10, wherein the plurality of uncooled microbolometer pixels is divided in groups of uncooled microbolometer pixels, and wherein a combination of the absorption spectra of the uncooled microbolometer pixels of each group forms a respective continuous absorption band in an absorption spectrum of the microbolometer array.

* * * * *